(12) United States Patent
Evers et al.

(10) Patent No.: US 11,308,068 B2
(45) Date of Patent: Apr. 19, 2022

(54) CONTROL SYSTEMS FOR DRAFT LIFECYCLE

(71) Applicant: SAP SE, Walldorf (DE)

(72) Inventors: Harald Evers, Walldorf (DE); Martin Zurmuehl, Mühlhausen (DE); Ralf Handl, Heidelberg (DE); Tilmann David Kopp, Karlsruhe (DE); Renzo Colle, Stutensee (DE)

(73) Assignee: SAP SE, Walldorf (DE)

( * ) Notice: Subject to any disclaimer, the term of this patent is extended or adjusted under 35 U.S.C. 154(b) by 1465 days.

(21) Appl. No.: 15/153,858

(22) Filed: May 13, 2016

(65) Prior Publication Data

US 2017/0329812 A1 Nov. 16, 2017

(51) Int. Cl.
*G06F 16/23* (2019.01)
*G06F 16/93* (2019.01)

(52) U.S. Cl.
CPC .......... *G06F 16/2315* (2019.01); *G06F 16/93* (2019.01)

(58) Field of Classification Search
CPC ......... G06F 17/30011; G06F 17/30351; G06F 16/2315; G06F 16/2343
USPC ................................................. 707/690, 608
See application file for complete search history.

(56) References Cited

U.S. PATENT DOCUMENTS

| | | | | |
|---|---|---|---|---|
| 6,067,551 A * | 5/2000 | Brown | ................... | G06Q 10/10 |
| 6,636,889 B1 * | 10/2003 | Estrada | ................... | G06Q 10/06 709/203 |
| 2003/0142126 A1 * | 7/2003 | Estrada | ............... | G06F 21/6218 715/738 |
| 2004/0158587 A1 * | 8/2004 | Shay | ...................... | G06Q 10/10 707/801 |
| 2009/0106247 A1 * | 4/2009 | Daughtry | ............... | G06F 21/604 |
| 2009/0125518 A1 * | 5/2009 | Bailor | ................... | G06F 3/1454 707/608 |
| 2009/0319544 A1 * | 12/2009 | Griffin | .................. | G06F 16/254 707/704 |
| 2011/0184906 A1 * | 7/2011 | Bailor | .................... | G06Q 10/10 707/608 |
| 2013/0339847 A1 * | 12/2013 | Bartek | ................... | G06Q 10/10 715/255 |
| 2016/0147560 A1 * | 5/2016 | Jolfaei | .................... | H04L 67/14 718/101 |

FOREIGN PATENT DOCUMENTS

EP 2469410 A2 * 6/2012 ............. G06F 9/505

* cited by examiner

*Primary Examiner* — Shahid A Alam
(74) *Attorney, Agent, or Firm* — Buckley, Maschoff & Talwalkar LLC

(57) ABSTRACT

A system includes identification of editing of an active document by a user, and, in response to the identified editing, setting of enqueue locks on the active document, creating a draft document corresponding to the active document and an enqueue context associated with the draft document, storing the enqueue context with the draft document and attaching the enqueue context to a request session, determining an eTag of the active document and storing the eTag with the draft document, and associating the user with the draft document as its exclusive user.

10 Claims, 29 Drawing Sheets

CONTROL SYSTEMS FOR DRAFT LIFECYCLE

BACKGROUND

In stateless communication models, optimistic locking is typically used to manage modifications to active documents and copies of active documents (i.e., drafts). Optimistic locking uses eTags to determine the validity of modifying operations with respect to a persisted document. If it is determined that a modifying operation is invalid due to a mismatch between eTags of a modified draft and its associated active document, a user is required to reload the active document and redo the changes, or to redo the changes in a second draft based on an updated active document.

In some scenarios, exclusive drafts (i.e., drafts editable by a single unique user) and shared edit drafts with a single active editing user prevent other users from modifying the active document and thus prevent optimistic lock collisions. Once durable enqueue locks (i.e., locks that are bound to a persisted document rather than to a volatile session) are set for the active document and associated with its draft document, the active document is also protected against unwanted side effects from other stateful applications or process integration logic that modifies the active document. As a consequence of this pessimistic lock approach, non-draft logic is blocked. In any of these cases lock situations are restricted to a reasonable period needed to finish processing a draft document and activating it to become an updated active document without collisions.

Thus, the pessimistic lock of the draft document itself and any associated enqueue lock may be seen as a critical resource allocation. Controlling the allocation purely by the application logic bears a high risk of stale pessimistic locks which hamper other users or automatic logic from processing the active document. Moreover, stale durable locks result in unintended consumption of an enqueue server's limited lock table resources, which may destabilize the lock table.

DETAILED DESCRIPTION

Figure 1:
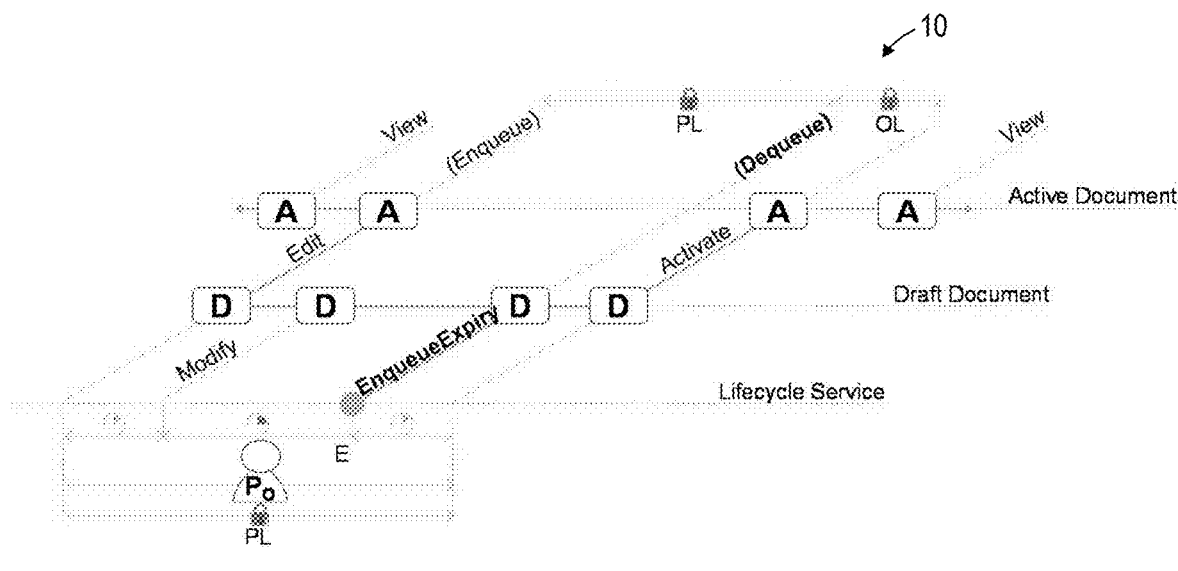
FIG. 1 is a diagram of a lifecycle scenario according to some embodiments.
Figure 1:
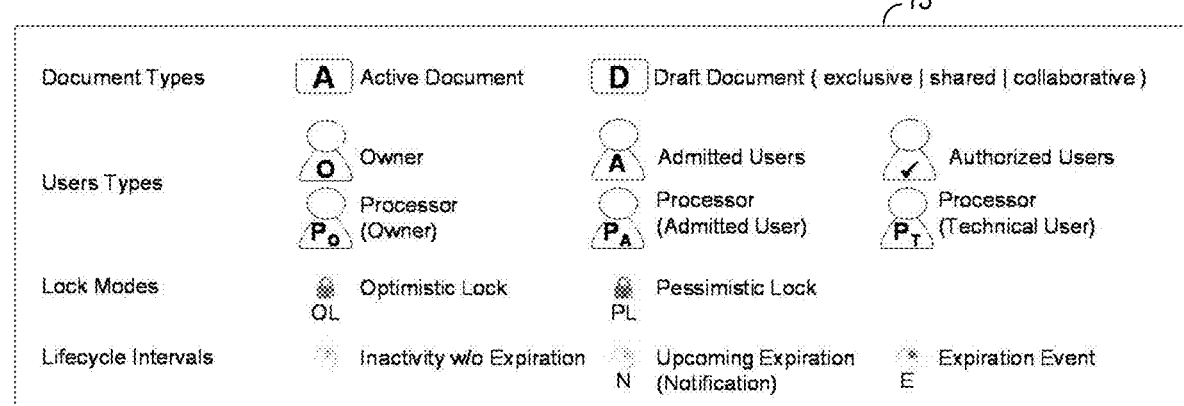

The following description is provided to enable any person in the art to make and use the described embodiments. Various modifications, however, will remain readily apparent to those in the art.

The use of draft copies of an active electronic document may enable stateless interactions according to some embodiments. The draft state is part of the electronic document's life cycle, in that embodiments allow the addition of an "initial draft document" state and an "edit draft copy" state to existing electronic documents. An initial draft document or edit draft copy are stored with each modifying request in order to enable a stateless communication paradigm.

A draft document as discussed herein may be exclusive, shared, or collaborative. Depending on the draft type, one to many "processors" (including the owner) may access and modify the draft. The processors belong to a set of authorized users having an authorization profile derived from the active document. Subsets of admitted users may be built from the authorized users using invitations (e.g., from the owner) or automatic granting (e.g., with respect to responsibilities for a certain business entity and its configuration (e.g. a product category).

Embodiments may also support a technical user that either acts with the authorization of the owner's role or in a privileged mode to perform the required lifecycle actions on the draft document.

An exclusive draft document is created by an owner who also is the only processor. Access to the draft document, and in particular to its contained changes, is restricted to this single person and to the lifecycle services. Nevertheless, non-admitted users may become aware of the draft's existence and even its administrative data (e.g., to contact the draft's owner in a critical blocking situation).

Per business entity (e.g., Sales Order, Purchase Order, Invoice, Leave Request, Product, Customer, Supplier, etc), an active document instance may be associated with none or only one exclusive edit draft document. Therefore, a non-expired exclusive edit draft document blocks other users from editing the active document. However, multiple exclusive new draft documents that are not related to an already-existing active document may exist per business entity and owner. These draft documents do not block other users unless dependent resources are pessimistically locked using durable enqueue locks.

A shared draft document is created by an owner who may also be one of its processors. Further users are either admitted by actively inviting them (e.g., by the owner) to access the draft document or by automatically granting them access based on responsibility or business configuration.

At maximum, only one processor of a shared draft is active at a given time. Accordingly, the existence of a non-expired processor assignment in the edit draft document blocks admitted users from editing the document. Clearing the processor assignment enables admitted users to become a processor and continue editing the draft. Like the exclusive edit draft, a non-expired shared edit draft document blocks all non-admitted and non-authorized users from editing the active document. Shared new draft documents, which are not related to any existing active document, do not block any other user or process unless dependent resources are pessimistically locked using durable enqueue locks.

A collaborative draft document is created by an owner who may also be one of its processors. Further authorized users are either admitted by actively inviting them to access the draft document (e.g., by the owner) or by automatically granting them access based on responsibility or business configuration.

Per business entity, an active document instance may have none or only one collaborative edit draft document. Multiple collaborative new draft documents may exist per business entity and owner. Furthermore, multiple authorized and specifically admitted users may access and process a collaborative draft document.

All admitted users as well as the owner may simultaneously be an active processor of a non-expired collaborative edit draft document. In other words, none of these processors is blocked from editing the draft document. Like the exclusive edit draft, a non-expired collaborative edit draft document blocks non-admitted and non-authorized users from editing the active document. Collaborative new draft documents do not block any other user or process unless dependent resources are pessimistically locked using durable enqueue locks.

A lifecycle service according to some embodiments responds to events in the context of a draft document and its associated active document. For example, a lifecycle service may handle expiration-based events with respect to a certain time of inactivity during the processing of a draft document. Notifications may be sent for upcoming expirations and when the lifecycle services take an action based on an expiration. A lifecycle service may further consider users and their roles as processors of a draft during its lifetime. Moreover, locking behavior and corresponding artifacts may be subject to the lifecycle service.

FIG. 1 illustrates timeline 10 of a scenario in which a lifecycle service according to some embodiments handles draft processing with enqueue lock expiration. In a conventional pessimistic locking scenario, durable enqueue locks are set to protect the active document for a short timeframe against side effects. This protection may expire after a certain time of inactivity (i.e., relative expiration) or after an interval that starts when acquiring the lock (i.e., fixed expiration).

According to timeline 10, and with reference to legend 15, an active document is viewed and editing thereof commences. The application logic is enabled to set enqueue locks on the active document at this point. Next, a draft document is created and an enqueue context is created, stored with the draft and attached in the request's session. The active document's eTag is also determined and stored with the draft. A processor is associated with the draft document as its exclusive user, locking the draft pessimistically for draft-aware applications of the corresponding business entity.

A series of arbitrary, modifying operations to the draft may now be performed, each of which is triggered without exceeding a predefined maximum inactivity time since the last change. At some point, the lifecycle service detects a draft's inactivity time which exceeds the configured durable enqueue lock expiration time. In response, the lifecycle service dequeues all durable enqueue locks bound to the enqueue context associated with the draft document and a notification is sent to the current processor.

While the draft is still pessimistically locked by the exclusive processor, the active document is transferred into an optimistic lock. Next, in response to an instruction to activate the modified draft, an enqueue context is attached, the active document is locked, and the eTags of the draft and active document are compared. If the eTags match, the active document is updated with the changes to the draft, the draft is deleted, and all enqueue locks are released upon commit. If the eTags do not match, the draft is discarded.

Figure 2:
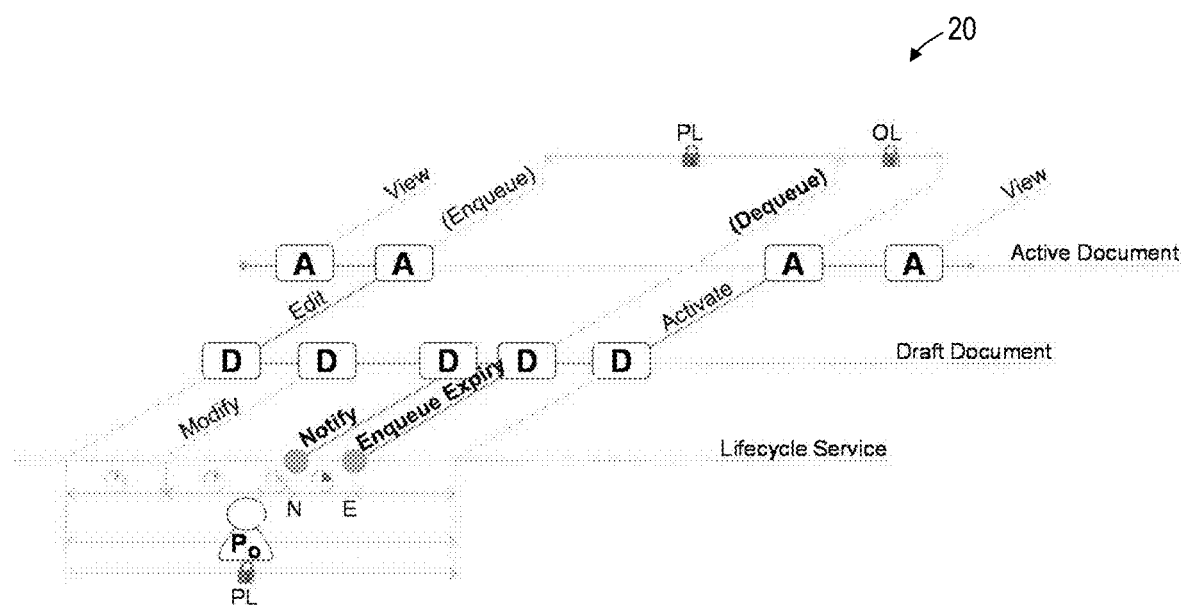
FIG. 2 is a diagram of a lifecycle scenario according to some embodiments.

According to the scenario of timeline 10, at least one durable enqueue lock of the active document expires. This lifecycle event creates a risk that changes in the draft may be lost due to conflicting modifications of the active document. Therefore, in the scenario of timeline 20 of FIG. 2, a warning notification is sent to the current processor of the draft in advance of the expiry to prevent subsequent draft collisions with the active document.

After creation and modification of the draft document as described above, the lifecycle service detects that a draft's inactivity time may exceed the configured durable enqueue lock expiration time and transmits a notification according to a second, configurable warning interval (e.g., x minutes in advance to the expiration). The notification is sent to the current processor, allowing the processor to take action by modifying the draft and implicitly resetting the expiration period, or by actively resetting (relative expiration) or extending (fixed expiration) the expiration period using a command available through a corresponding user interface.

If such action is taken, monitoring of the inactivity time restarts and continues as described above. If the processor takes no action, the expiration event occurs and post-expiration processing continues as described with respect to timeline 10.

Figure 3:
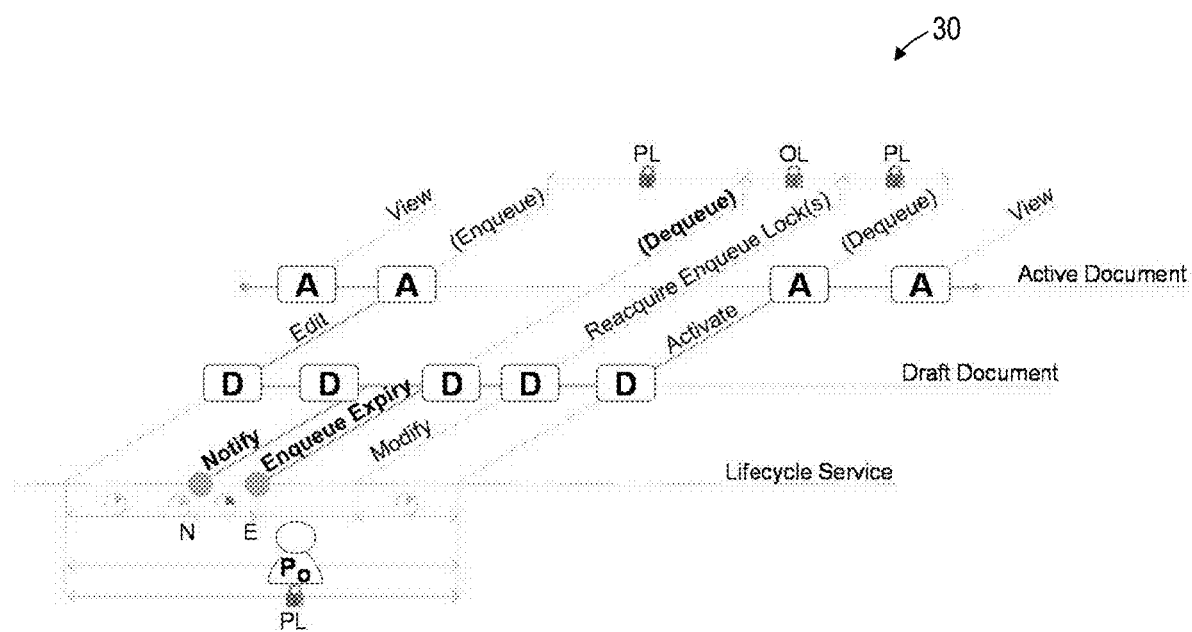
FIG. 3 is a diagram of a lifecycle scenario according to some embodiments.

In timeline 10, draft activation follows the enqueue lock expiration. A possibly more common scenario is shown in FIG. 3, where the pessimistic lock on the active document has expired and the processor wishes to continue modifying the draft. Timeline 30 therefore provides for reacquisition of former locks. As shown, former locks are reacquired after enqueue lock expiration and once processing of the draft is resumed (e.g., a modify operation). To acquire the former locks, the eTag associated with the draft is compared with the current eTag retrieved from the active document. If the eTags match, the application logic callback allows reacquiring appropriate locks of the active document, transferring the scenario back to a pessimistic lock model. The draft is then updated and further modifications may follow as described above. However, if the eTags do not match (i.e., the optimistic lock fails), the draft is discarded.

Figure 5:
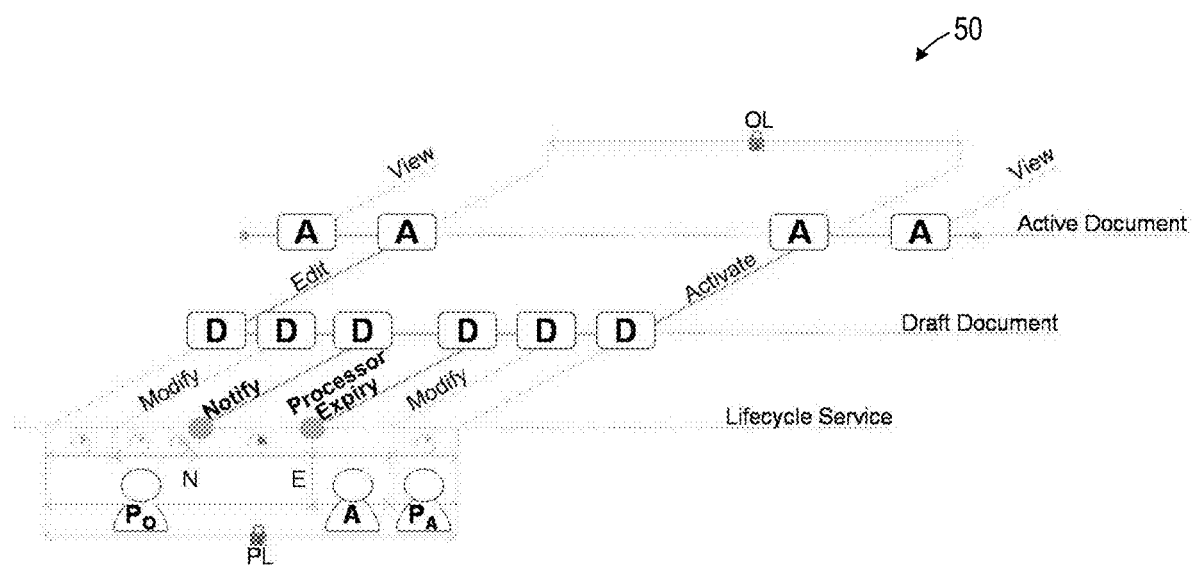
FIG. 5 is a diagram of a lifecycle scenario according to some embodiments.
Figure 6:
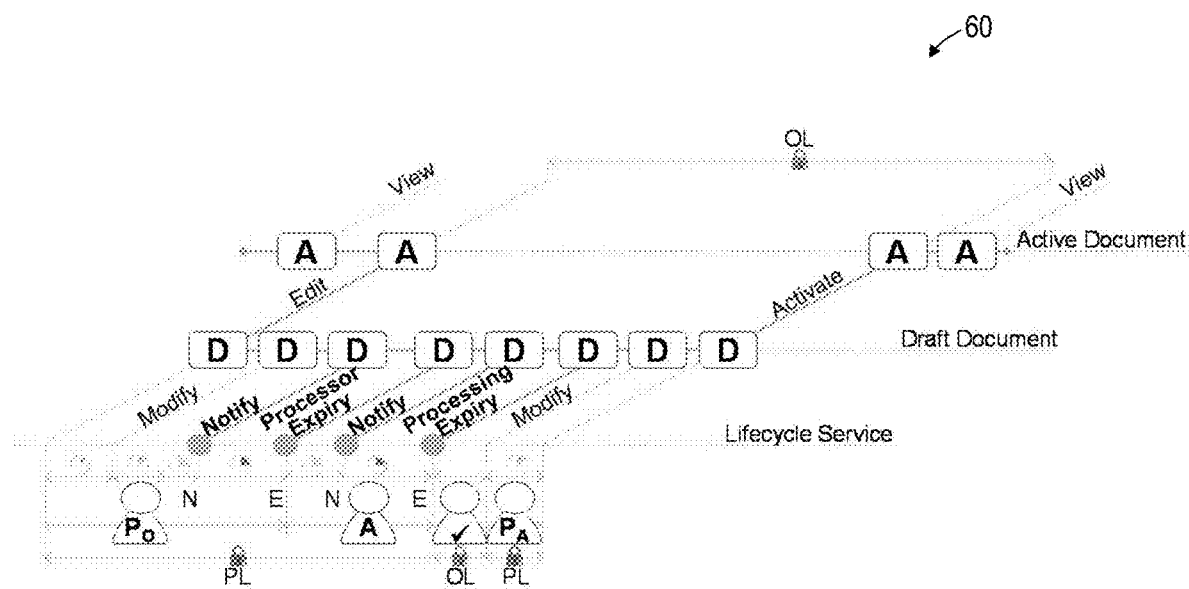
FIG. 6 is a diagram of a lifecycle scenario according to some embodiments.

Lifecycle scenarios which include processor expiration revoke the exclusive behavior of a draft document, effectively transferring the behavior from a pessimistic to an optimistic handling. The scenario is relevant to the exclusive and shared draft types. Although the scenarios of FIGS. 4-6 depict handling of an optimistically-locked active document, they can be combined with the above-described pessimistic approaches using durable enqueue locks and the corresponding lifecycle events.

Figure 4:
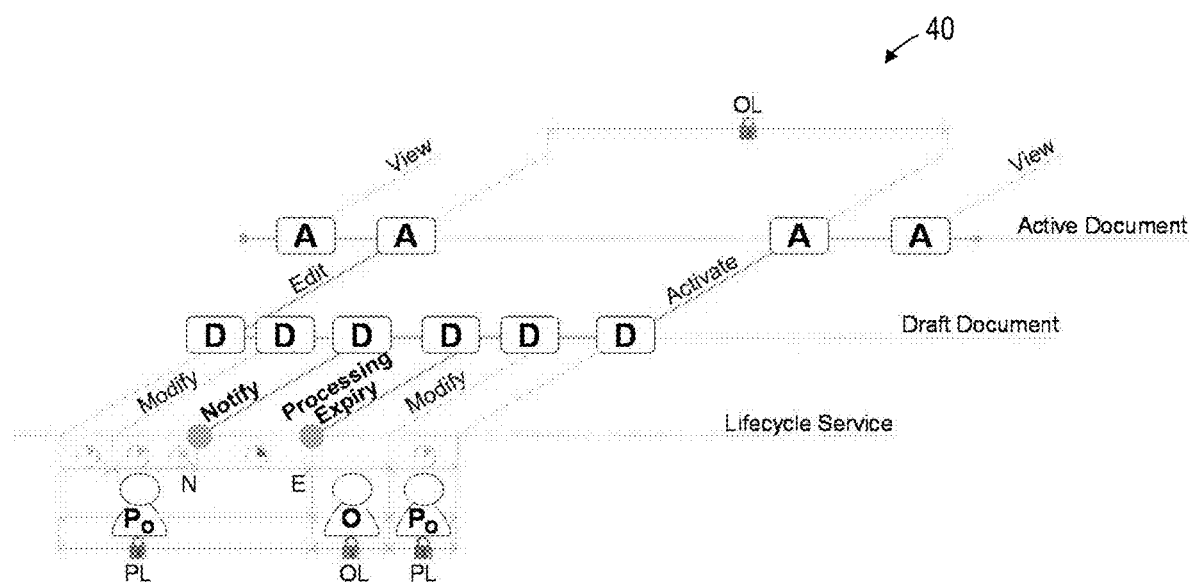
FIG. 4 is a diagram of a lifecycle scenario according to some embodiments.

According to timeline 40 of FIG. 4, the processing expiration in an exclusive draft releases the pessimistic locking behavior in draft aware applications. Once the current processor is cleared, other authorized users are no longer blocked. The other authorized users may edit the corresponding active document with their own exclusive draft document, in which case the existing draft has to be deleted. As long as this does not happen, the draft remains optimistically locked and the owner may resume editing it and thereby implicitly become the processor again.

With specific reference to timeline 40, editing the active document causes creation of a draft document and locking of the active document to exclude any concurrent modifications. Upon successful locking, the eTag of the active document is determined and the eTag is stored with the draft's administrative data. The lock of the active document is released at the end of the request's Logical Unit of Work (i.e., it is not preserved as a durable enqueue lock). A processor is set in the draft document as the exclusive user, which locks the draft and the corresponding active document pessimistically for draft aware applications of the corresponding business entity. A series of arbitrary, modifying draft operations may then occur, without exceeding the maximum inactivity time since the last change.

As described above, the lifecycle service may detect that a draft's inactivity will exceed the configured processing expiration time and issue a notification according to a configurable warning interval. The notification is sent to the current processor, allowing the processor to take action by modifying the draft and implicitly resetting the expiration period, or by actively resetting (relative expiration) or extending (fixed expiration) the expiration period using a command available through a corresponding user interface. The processing expiration event occurs if the processor takes no action after receiving the notification.

Next, according to FIG. 4, the exclusive processor (InProcessByUser) is cleared in the draft's administrative data. The draft document is transferred to an optimistic lock mode, (i.e., other authorized users may start editing the active document (not illustrated)). The owner of the draft may resume editing the (now optimistically locked) draft document.

Processor expiration in the case of a shared draft will be described with respect to timeline 50 of FIG. 5. After a first configurable interval of inactivity, the exclusive processing protection of the current processor is released, thereby allowing other admitted users to take over. The draft document remains pessimistically locked for non-admitted, authorized users.

Timeline 50 may proceed as described above with respect to timeline 40 until a processor expiration event occurs. Then, the exclusive processor is replaced by a <vacancy token> in the draft's administrative data. The shared draft document remains in a pessimistic lock mode for non-admitted users, but they may begin editing the active document. Admitted users of the draft may resume editing the draft document and become a current processor.

With respect to timeline 60, if there is further inactivity (i.e., for another configurable interval) after expiry of the shared draft's processor, the processing itself may expire, thereby transferring the draft document from a pessimistic to an optimistic locking. Once the shared processing expires other authorized users are no longer blocked. They may edit the corresponding active document with their own exclusive draft document, in which case the existing draft is deleted. As long as this does not happen, the draft remains optimistically locked and the owner or any other admitted processor may resume editing it and implicitly become the processor again.

Continuing with timeline 60, the lifecycle service may detect that a draft's inactivity will exceed the configured processing expiration time and issue a notification according to a configurable warning interval. The notification is sent to the admitted users, allowing them to take action by modifying the draft and implicitly resetting the expiration period, or by actively resetting (relative expiration) or extending (fixed expiration) the expiration period using a command available through a corresponding user interface. The processing expiration event occurs if no admitted user takes action after receiving the notification.

The exclusive processor is cleared in the draft's administrative data. The shared draft document is transferred to optimistic lock mode, i.e. non-admitted users may start editing the active document (not shown in figure). Admitted users of the draft may resume editing their (optimistically locked) draft document and become a current processor.

Scenarios with an optimistically locked active document bear the risk that concurrent business logic, for instance performed by process integration logic or non-draft aware applications, modify the active document and thus its eTag. A non-matching eTag, stored with the draft, will prevent an activation of any changes applied to a draft document. Therefore, a lifecycle service may already detect such situations in advance. As long as there are no merge capabilities designed for the draft document with the non-matching eTag, it is discarded. All admitted users are notified upon this event.

Figure 7:
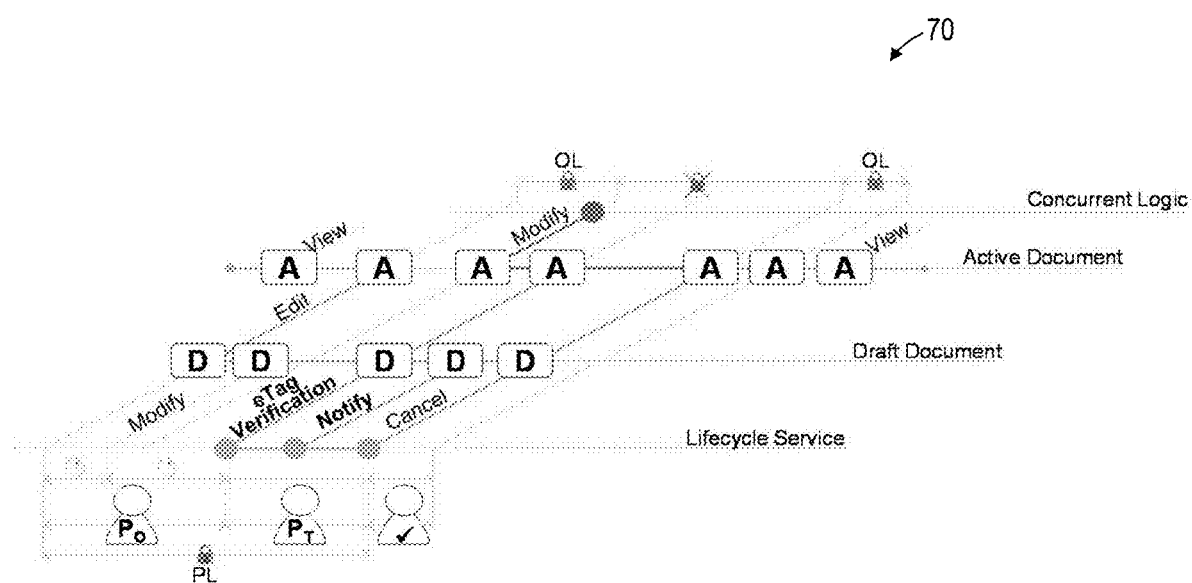
FIG. 7 is a diagram of a lifecycle scenario according to some embodiments.

With respect to FIG. 7, editing the active document causes creation of a draft document and locking of the active document to exclude any concurrent modifications. After such locking, the eTag of the active document is determined and the eTag is stored with the draft's administrative data. The lock of the active document is released at the end of request processing. A processor is set in the draft document as the exclusive user, which locks the draft and the corresponding active document pessimistically for draft aware applications of the corresponding business entity. A series of arbitrary modifying draft operations may then occur, without exceeding the maximum inactivity time since the last change.

Next, a concurrent modification from concurrent business logic modifies the active document and changes the eTag of the active document. An eTag verification lifecycle service detects the mismatch between the active and draft documents' eTags, resulting in a notification to all admitted users. The draft is cancelled and thus deleted, or, alternatively, the draft is kept but marked as outdated in its administrative data. The active document then becomes available to all authorized users for draft processing.

As described in several scenarios above, draft documents may transition to an optimistic locking model where they still exist and admitted users can resume editing them. This could present an infinite interval. However, data privacy obligations and potential data volume growth incentivize expiry and deletion of draft documents. Typically, the interval for such an expiry is longer than for the above-described resource critical intervals.

This interval may be configurable to a fixed draft lifetime value, but a lifecycle service may alternatively consider the number of changes in the draft. The lifecycle service may run at a lower frequency than required in the above-described scenarios.

Figure 8:
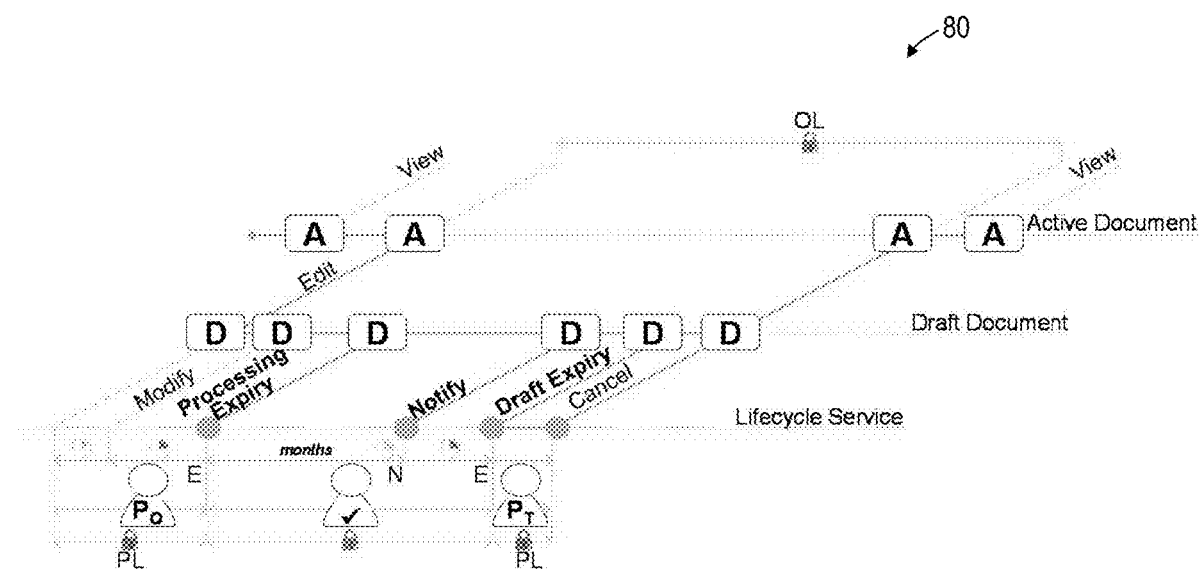
FIG. 8 is a diagram of a lifecycle scenario according to some embodiments.

As demonstrated by timeline 80 of FIG. 8, a processing expiry event occurs after variously modifying a draft document. The draft transitions to an optimistic mode allowing either admitted users to resume modifying it or authorized users to discard it and replace it with a new one.

Optionally, a lifecycle service detects a draft's inactivity that will exceed the configured draft expiration time within a configurable warning interval. A notification is sent to the admitted users, allowing them to take action by modifying the draft and implicitly resetting the expiration period, or by actively resetting or extending the expiration period. The draft expiration event eventually occurs if no admitted user resumes editing the draft. The lifecycle service then cancels the draft document and thus deletes it.

Figure 9:
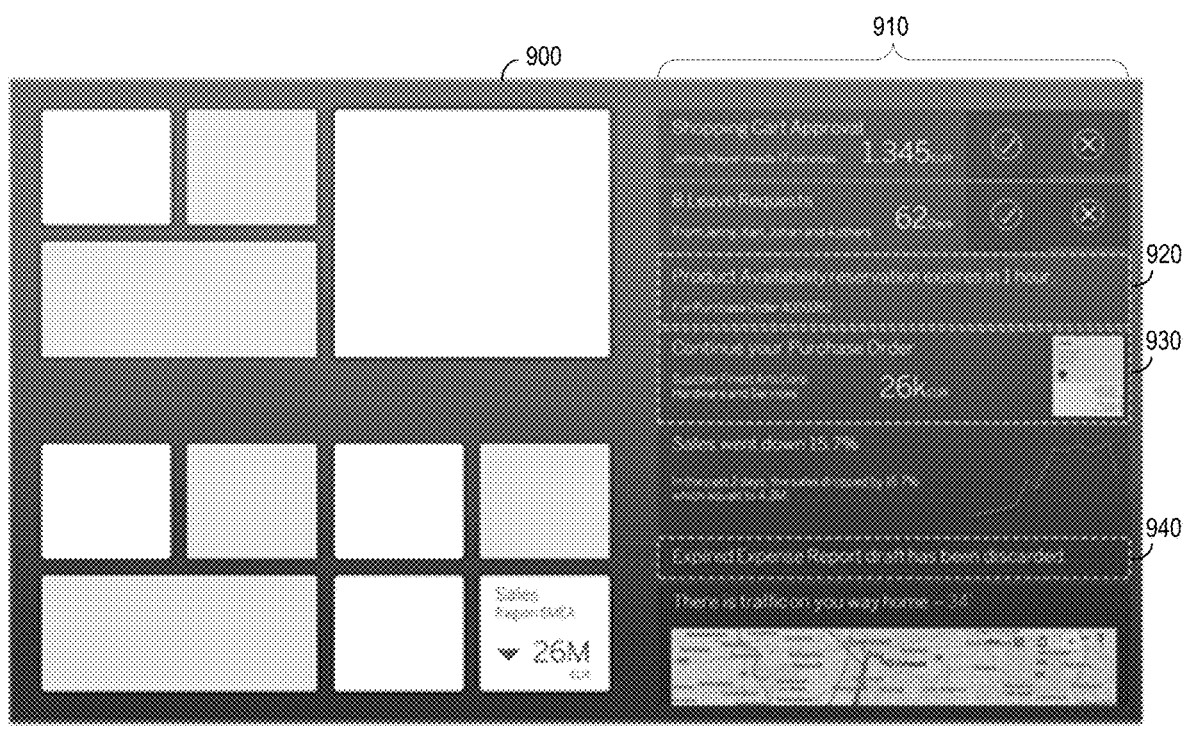
FIG. 9 is an outward view of a user interface according to some embodiments.

User interface 900 of FIG. 9 may be displayed by a client device executing a browser or other application as will be described in more detail below. User interface 900 includes notification area 910 for displaying notifications to a user as described above. For example, notifications 920, 930 and 940 each relate to expiry of changes made to draft documents. Embodiments are not limited to user interface 900.

In one example of some embodiments, a user creates an edit draft for modifying an active document using a browser-based application executing on a desktop computer. Creation of the edit draft sets a durable enqueue lock for the active document, which is associated with the draft's enqueue context. It will be assumed that the user and processor of the draft becomes occupied with another task and ceases interaction with the edit draft while the browser-based application remains open on the desktop computer.

After a certain time of draft inactivity, and with respect to the configured warning interval (e.g., 10 minutes), an enqueue lock expiration handler triggers a notification to the draft processor (InProcessByUser). The notification will be pushed to all connected/configured channels, (e.g., notification area 910), as well as to a native mobile notification. The user notices the notification on his/her mobile phone. The notification message provides an interface for the user to request an extension of the pessimistic lock.

An OData request is invoked to set the last change timestamp in the draft's administrative data to the current time. This implicitly prolongs the relative lock by another interval. After returning to the desktop, the user reloads the draft to refresh the current state, since the eTag has changed due to the administrative data modification. The user may then continue to edit the draft and later activate it to update the active document.

Figure 10:
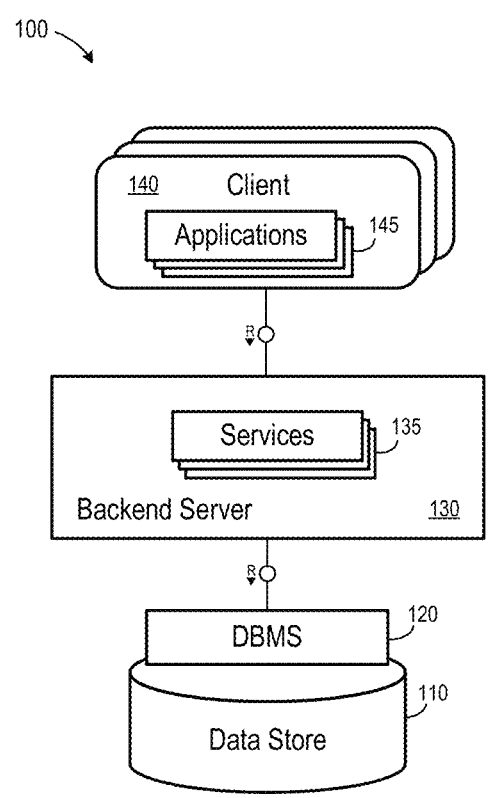
FIG. 10 is a block diagram of an architecture according to some embodiments.

FIG. 10 is a block diagram of architecture 100 according to some embodiments. Embodiments are not limited to architecture 100 or to a database architecture.

Architecture 100 includes data store 110, database management system (DBMS) 120, backend server 130, services 135, clients 140 and applications 145. Generally, services 135 executing within backend server 130 receive requests from applications 145 executing on clients 140 and provides results to applications 145 based on data of data store 110. The requests may include instructions to edit data of data store 110.

More specifically, application server 130 executes and provides services 135 to applications 145. Services 135 may comprise server-side executable program code (e.g., compiled code, scripts, etc.) which provide functionality to applications 145 by providing user interfaces to clients 140, receiving requests from applications 145, retrieving data from data store 110 based on the requests, processing the data received from data store 110, and providing the processed data to applications 145. Services 135 may be made available for execution by application server 130 via registration and/or other procedures which are known in the art.

Application server 130 provides any suitable interfaces through which applications 145 executing on clients 140 may communicate with services 135 executing on application server 130. For example, application server 130 may include a HyperText Transfer Protocol (HTTP) interface supporting a transient request/response protocol over Transmission Control Protocol (TCP), and/or a WebSocket interface supporting non-transient full-duplex communications between application server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from or closely integrated with DBMS 120. A closely-integrated application server 130 may enable execution of services 135 completely on the database platform, without the need for an additional application server. For example, according to some embodiments, application server 130 provides a comprehensive set of embedded services which provide end-to-end support for Web-based applications. The services may include a lightweight web server, configurable support for Open Data Protocol, server-side JavaScript execution and access to SQL and SQLScript.

Application server 130 may provide application services (e.g., via functional libraries) using which services 135 may manage and query the data of data store 110. The application services can be used to expose the database data model, with its tables, views and database procedures, to clients. In addition to exposing the data model, application server 130 may host system services such as a search service.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Each of clients 140 may comprise one or more devices executing program code of a software application 145 for presenting user interfaces to allow interaction with application server 130. The user interfaces of applications 145 may comprise user interfaces suited for reporting, data analysis, and/or any other functions based on the data of data store 110.

Presentation of a user interface as described herein may comprise any degree or type of rendering, depending on the type of user interface code generated by application server 130. For example, a client 140 may execute a Web Browser to request and receive a Web page (e.g., in HTML format) from application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine. In another method, one of more of clients 140 execute applications 145 loaded from an application server 130, that receive data and metadata by requests to services 135 executed on the application server 130. Data and metadata is processed by the applications 145 to render the user interface on the client 140.

Figure 11:
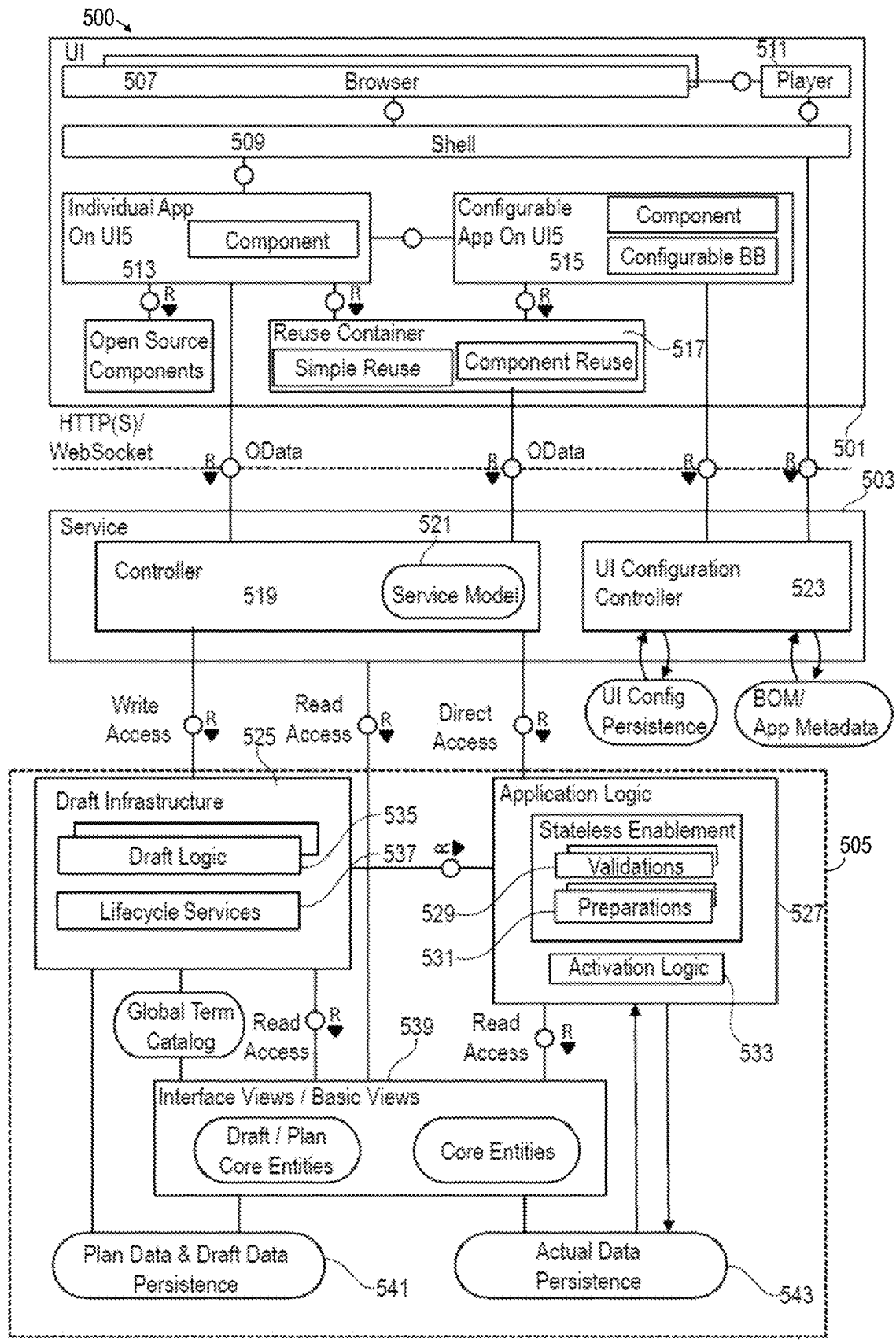
FIG. 11 is a block diagram of an architecture according to some embodiments.

FIG. 11 depicts system 500 in accordance with some embodiments. System 500 may comprise an implementation of system 100, but embodiments are not limited thereto. System 500 may support the OData communication protocol. Components of system 500 comprise client terminal 501, service 503 and backend server 505.

Client terminal 501 may comprise a user interface (e.g., for database applications) that may be generated by processor-executable code of a software application executing within client terminal 501. The user interface may be browser-based and available in a responsive design on multiple device types. The browser may enable access to multiple applications (513, 515) which are managed by shell 509. Within browser 507, shell 509 is executed to start an application and enable cross-application services like search, navigation, application favorites and document bookmarks, notifications and tasks, or user profile related functions. The role-based shell content may be based on application catalogs of the multiple applications whose entries are associated with user roles that refer to required authorizations in draft logic 535. For certain mobile devices, player 511 is provided which encapsulates the browser's behavior in order to, e.g., optimize the cache strategy in mobile networks or to enable native device capabilities.

Service 503 enables decoupled access to backend server's 505 logic and data, shell content and layered user interface configurations, or application metadata. Service 503 targets at harmonized access by introducing communication using the OData protocol in a stateless, REST based manner. OData services are exposed on a web tier either using HTTPS short-term as technical protocol or considering WebSockets as a mid-term option for interactive and collaborative scenarios.

Service 503 comprises a controller 519 that relates to OData services implemented by model and data providers. For applications and data, service model 521 is typically tailored to a certain application design. However, it may be reused in a family of similar applications or for application variants that, e.g., address different device channels. Service model 521 is a projection of the underlying electronic document (the actual data) persistence or the temporary data in the draft persistence.

However, the data persistence is not directly mapped to service model 521. It is first modeled in Core Data Services (CDS) interface views, in particular, in basic views of normalized core or draft entities. These CDS views are the source for creating Service Adaptation Description Language (SADL)-based OData Services supporting a de-normalized projection to OData entities. The SADL-based OData service is used for complex transactions to access data by SQL derived from the views in pure read-only scenarios. In transactional/write scenarios, the OData service calls draft infrastructure 525 of the draft logic 535 to support intermediate draft documents or copies and thereby stateless interactions. In addition, it is possible to directly call the underlying application logic for simple task enabling applications.

A separate set of UI configuration controllers 523 of service 503 control access to metadata such as layered UI configurations and personalization, application catalogs and descriptions (e.g., Bill of Material), or semantic objects and navigation targets.

Draft logic 535 may comprise application logic 527. An implementation of the application logic 527 may exist based on a stateful programming model. Calling this stateful logic may be used for single requests in task enabling application, but not for the series of requests required in complex transactions. Instead, a stateless processing of a draft document is introduced. However, even the draft may incorporate parts of the application logic, e.g., for incremental creation of documents or in general for an acceptable usability for end-users editing a draft.

Application logic 527 is labeled Stateless Enablement to refer to application coding disassembled from the stateful chunk to be called in small units from draft infrastructure 525. The stateless enablement attempts to extract side effect-free functionality for validations 529 and preparations 531. Preparations 531 are meant to initialize draft entity data in the course of gradually entering data in the application UI. The purpose of validations 529 is to increase user comfort and return warning messages specific to already entered data. With this approach, a stateless enablement as the interface with the draft document or copy can be accomplished and more preparations and validations may be added over time.

Activation logic 533 relates draft logic and application logic. Activation logic 533 may be a broad API that receives and processes a finalized draft document or copy. The draft copy or document is activated to become an (active) electronic document (e.g., by copying the content of the draft copy into the electronic document) in the actual data persistence and is deleted thereafter.

According to some embodiments, draft documents are stored in the database as draft data persistence 541. As described herein, a draft document receives the logical ownership of pessimistic locks and reservations. The drafts enable stateless interactions as described herein.

The draft state is an integral part of a electronic document's lifecycle. Draft infrastructure 525 allows the addition of an "initial draft document" as well as an "edit draft copy" state to existing electronic documents. Draft logic 535 provides the OData functions derived from a draft state model. Draft logic 535 stores an initial draft document or edit draft copy with each modifying request in order to enable the above formulated stateless communication paradigm. Draft logic 535 and its core choreography may be generated in a consistent way. It establishes the handling of transactions and lock contexts and offers callbacks to the stateless enabled application logic for validations and preparations as well as the application logic upon draft activation. Draft logic 535 may use a Business Object Processing Framework (BOPF) introducing an observer pattern to react to user entries with specific preparations and validations.

Since drafts (i.e., initial draft documents and edit drafts) and locks of the drafts are decoupled from the Advanced Business Application Programming (ABAP) communication session (in that the drafts and locks are independent of whether the communication session is ended or not) and memory, draft infrastructure 525 may comprise lifecycle services 537 that handle expirations and notification events as described herein. For example, lifecycle services 537 may remove associated drafts or locks upon expiration.

The draft model shall be generated with respect to normalized core entity views. Modeling the draft close to the application may enable various projections for application UIs and ease the activation logic and interface. Such a draft may also be used in extended scenarios like forward error handling, staging of master data, import of data from external formats, or offline support.

Backend server 505 may further comprise interface 539 for accessing drafts (e.g., initial draft documents and/or edit drafts) persisted or stored in database tables 541 and for accessing electronic documents persisted or stored in database tables 543.

Figure 12:
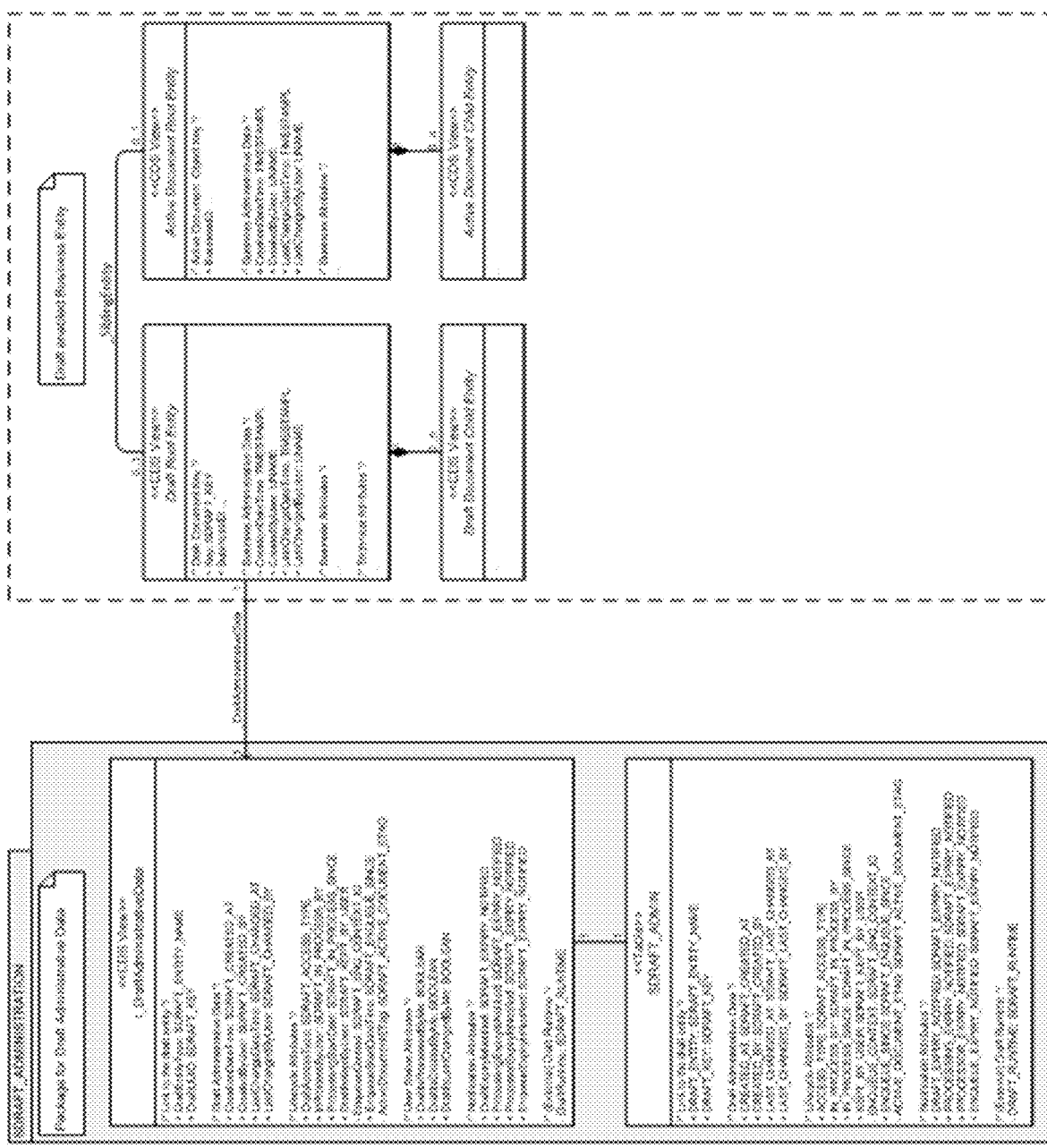
FIG. 12 illustrates a logical structure of draft administrative data according to some embodiments.

FIG. 12 is a class diagram of administrative data which may be associated with a root entity of a draft according to some embodiments. The draft administrative data is used to manage lifecycle events as described herein. Although the diagram depicts association with the draft's root entity, some embodiments may allow association with child entities as well. The following table describes the attributes of the draft administrative data according to some embodiments.

| CDS Attribute | DB Field | Type |
|---|---|---|
| Link to Draft Entity | | |
| DraftEntityType | DRAFT_ENTITY | SDRAFT_ENTITY_NAME |
| | The entity type of the associated draft root entity | |
| DraftUUID | DRAFT_KEY | SDRAFT_KEY |
| | The key of the draft root entity as a GUID | |
| Draft Administrative Data | | |
| CreationDateTime | CREATED_AT | SDRAFT_CREATED_AT |
| | The date and time the draft has been created as timestamp. | |
| CreatedByUser | CREATED_BY | SDRAFT_CREATED_BY |
| | The user (owner) that created the draft as backend user name. | |
| LastChangeDateTime | LAST_CHANGED_AT | SDRAFT_CHANGED_AT |
| | The date and time of the draft's last update as timestamp. | |
| LastChangedByUser | LAST_CHANGED_BY | SDRAFT_CHANGED_BY |
| | The user (processor) that performed the last update | |
| Lifecycle Attributes | | |
| DraftAccessType | ACCESS_TYPE | SDRAFT_ACCESS_TYPE |
| | The access type of the draft | |
| | 0 = Exclusive draft access (single user) | |
| | 1 = Shared draft access (multiple users, one at a time) | |
| | 2 = Collaborative draft access (multiple users, simultaneously) | |
| InProcessByUser | IN_PROCESS_BY | SDRAFT_IN_PROCESS_BY |
| | The user acting as the current, exclusive processor as backend user name. | |
| ProcessingStartDateTime | PROCESSING_SINCE | SDRAFT_IN_PROCESS_SINCE |
| | The date and time an exclusive processor has been set for the draft as timestamp. | |
| DraftIsKeptByUser | KEPT_BY_USER | SDRAFT_KEPT_BY_USER |
| | Boolean value that is true once a user explicitly decides to keep the draft. | |
| EnqueueContext | ENQUEUE_CONTEXT | SDRAFT_KEPT_BY_USER |
| | The enqueue context used to associate durable enqueue locks with the draft. | |

-continued

| CDS Attribute | DB Field | Type |
|---|---|---|
| EnqueueStartDateTime | ENQUEUE_SINCE | SDRAFT_ENQUEUE_SINCE |
| | The date and time an enqueue context (or first lock) has been created for the draft as timestamp. | |
| ActiveDocumentETag | ACTIVE_DOCUMENT_ETAG | SDRAFT_ACTIVE_DOCUMENT_ETAG |
| | The eTag of the active document at creation time as character hash value. | |
| User Status Attributes | | |
| DraftIsProcessedByMe | - (transient) | BOOLEAN |
| | True if the InProcessByUser is equal to the backend user requesting the view. | |
| DraftIsLastChangedByMe | - (transient) | BOOLEAN |
| | True if the LastChangedByUser is equal to the backend user requesting the view. | |
| DraftIsCreatedByMe | - (transient) | BOOLEAN |
| | True if the CreatedByUser is equal to the backend user requesting the view. | |
| Notification Attributes | | |
| DraftExpiryIsNotified | DRAFT_EXPIRY_NOTIFIED | SDRAFT_EXPIRY_NOTIFIED |
| | True once a notification about an expiring draft (that will be deleted) has be sent. | |
| ProcessingExpiryIsNotified | PROCESSING_EXPIRY_NOTIFIED | SDRAFT_EXPIRY_NOTIFIED |
| | True once a notification about an expiring processing (that will propagate the draft into an optimistic lock mode) has be sent. | |
| ProcessorExpiryIsNotified | PROCESSOR_EXPIRY_NOTIFIED | SDRAFT_EXPIRY_NOTIFIED |
| | True once a notification about an expiring processor (that will release a shared draft for admitted users) has be sent. | |
| EnqueueExpiryIsNotified | ENQUEUE_EXPIRY_NOTIFIED | SDRAFT_EXPIRY_NOTIFIED |
| | True once a notification about an expiring enqueue context (that will release all its associated durable enqueue lock(s)) has be sent. | |
| External Draft Runtime Attributes | | |
| DraftRuntime | SDRAFT_RUNTIME | SDRAFT_RUNTIME |
| | Registered identifier of (external) draft runtime. | |

When creating an exclusive or shared new draft the attributes of administrative data are set as follows:

| Attribute | Value |
|---|---|
| DraftEntityType | <entity type of draft root> |
| DraftUUID | <GUID of created new draft root entity> |
| CreationDateTime | <current timestamp> |
| CreatedByUser | <ID of user executing the operation> |
| LastChangeDateTime | <current timestamp> |
| LastChangedByUser | <ID of user executing the operation> |
| DraftAccessType | [0 = Exclusive | 1 = Shared | 2 = Collaborative] |
| InProcessByUser | <ID of user executing the operation> |
| ProcessingStartDateTime | <current timestamp> |
| DraftIsKeptByUser | False |
| EnqueueContext | Initial (there is no active document to be locked) |
| EnqueueStartDateTime | Initial |
| ActiveDocumentETag | Initial (there is no active document to be matched) |
| DraftExpiryIsNotified | False |
| ProcessingExpiryIsNotified | False |
| ProcessorExpiryIsNotified | False |
| EnqueueExpiryIsNotified | False |
| DraftRuntime | <Application Infrastructure Default> |

A draft is in an initial state as long as the LastChangeDateTime is equal to CreationDateTime. The processing or draft expiry lifecycle service described below may exploit this information to distinguish unintentionally created drafts and handle them earlier than drafts with modifications.

When creating an exclusive or shared edit draft the attributes of administrative data are set as follows:

| Attribute | Value |
|---|---|
| DraftEntityType | <entity type of draft root> |
| DraftUUID | <GUID of created edit draft root entity> |
| CreationDateTime | <current timestamp> |
| CreatedByUser | <ID of user executing the operation> |
| LastChangeDateTime | <current timestamp> |
| LastChangedByUser | <ID of user executing the operation> |
| DraftAccessType | [0 = Exclusive | 1 = Shared | 2 = Collaborative] |
| InProcessByUser | <ID of user executing the operation> |
| ProcessingStartDateTime | <current timestamp> |
| DraftIsKeptByUser | False |
| EnqueueContext | <enqueue context if created> |
| EnqueueStartDateTime | <current timestamp> |
| ActiveDocumentETag | <eTag value> |
| DraftExpiryIsNotified | False |
| ProcessingExpiryIsNotified | False |
| ProcessorExpiryIsNotified | False |
| EnqueueExpiryIsNotified | False |
| DraftRuntime | <Application Infrastructure Default> |

Each time an exclusive or shared draft is modified the attributes of administrative data are updated as follows:

| Attribute | Value |
|---|---|
| LastChangeDateTime | <current timestamp> |
| LastChangedByUser | <ID of user executing the operation> |
| InProcessByUser | <ID of user executing the operation> |
| ProcessingStartDateTime | <current timestamp> |
| EnqueueContext | <enqueue context if created> |
| EnqueueStartDateTime | <current timestamp> |
| DraftExpiryIsNotified | False |
| ProcessingExpiryIsNotified | False |
| ProcessorExpiryIsNotified | False |
| EnqueueExpiryIsNotified | False |
| DraftIsKeptByUser | True |

As will be described below, the updated timestamp of LastChangeDateTime is used by lifecycle services as a condition for selecting rows of the administrative data table. The InProcessByUser and ProcessingStartDateTime attributes are set if they are empty, i.e., if the draft processing is resumed after processing or processor expiration.

The LastChangeDateTime may further serve as the eTag value of the draft itself. The draft infrastructure enables this write operation to the attribute and merges it with the above mentioned automatic updates to the administrative data.

Even though a validation is side-effect free, it may store messages with the draft as part of the state. Therefore, the LastChangeDateTime is updated with the current timestamp as shown below:

| Attribute | Value |
|---|---|
| LastChangeDateTime | <current timestamp> |
| LastChangedByUser | <ID of user executing the operation> |
| InProcessByUser | <ID of user executing the operation> |
| ProcessingStartDateTime | <current timestamp> |
| DraftExpiryIsNotified | False |
| ProcessingExpiryIsNotified | False |
| ProcessorExpiryIsNotified | False |
| EnqueueExpiryIsNotified | False |

If the processor is cleared and editing is resumed with a validation, the LastChangedByUser is set to the user performing the operation.

To activate a draft, the administrative data entity associated with the draft root entity is deleted after successful activation, resulting in no further updates of attributes. Upon error the attributes are set as described for draft modification.

To cancel a draft, the administrative data entity associated with the draft root entity is deleted as well, resulting in no further updates of attributes.

A special behavior is used to distinguish draft documents that were implicitly (i.e., automatically) saved from those explicitly kept by the user. Such a user decision may be enforced when leaving an application (e.g., using Back or Home navigation controls) or when re-opening a formerly created draft in the application.

The draft status may be differentiated by the DraftIsKeptByUser attribute. This attribute is set to true for above mentioned type of user actions. This may be accomplished either by exposing the draft administrative data for direct write access, for example, through a PATCH, or by a draft lifecycle OData facade with a KeepDraft function import.

According to some embodiments, a set of lifecycle service handlers handles the different lifecycle scenarios introduced above. The handlers will now be briefly introduced.

A lifecycle service dispatcher does not directly process a lifecycle scenario. When triggered, it rather dispatches the trigger to the registered lifecycle service handlers with respect to their configured frequency. The enqueue lock expiration handler selects all draft documents with an expiring or expired enqueue context. For drafts with an expiring enqueue context, a notification shall be sent and enqueue locks associated with expired enqueue context shall be released.

The processor expiration handler selects all shared draft documents with an expiring or expired processor. For expiring processors, a notification shall be sent to them, whereas expired processors (InProcessByUser) are cleared (in this case replaced by a <vacancy token> as indicator for other admitted users) and then notified.

The processing expiration handler selects all exclusive and shared draft documents with an expiring or expired processing time. For draft documents with expiring processing time, a notification shall be sent to the admitted users, whereas for draft documents with an expired processing time the processor (InProcessByUser) shall be cleared and then notified. The draft is kept in an optimistic locking model. Edit drafts that were not explicitly kept by the user shall be expired earlier.

The eTag verification handler selects all draft documents with an invalid active document eTag. For invalidated drafts, a notification shall be sent to the admitted users. The drafts shall either be cancelled and deleted or marked as outdated to enable the user to review his changes and cancel the draft by user action.

The draft expiration handler selects all draft documents with an expiring or expired lifetime. For expiring drafts a notification, shall be sent to the admitted users, whereas expired drafts shall be cancelled (i.e., deleted) and their admitted users be notified.

Edit drafts that were created but never modified (i.e., unintentionally edited drafts) may be treated by a specific lifecycle service handler or as part of the enqueue lock and/or processing expiration handler. The handler or behavior selects all draft documents with identical creation and last change timestamps. The drafts are transferred into optimistic mode so that non-admitted users are not blocked from editing the active documents. The drafts may be completely expired and deleted at a later time. In a similar approach, an edit draft that was not explicitly kept by a user within a certain interval may be transferred to optimistic mode earlier than an explicitly saved draft document.

In some embodiments, there is no specific lifecycle handler for external draft runtimes. Instead, all of the above mentioned infrastructure's expiration lifecycle handlers propagate their events to external draft runtimes via an API implemented by them.

FIGS. 13 through 21 describe behavior of a lifecycle service according to some embodiments, per scenario and handler. Each handler may maintain application log entries including summaries of actions taken.

Figure 13:
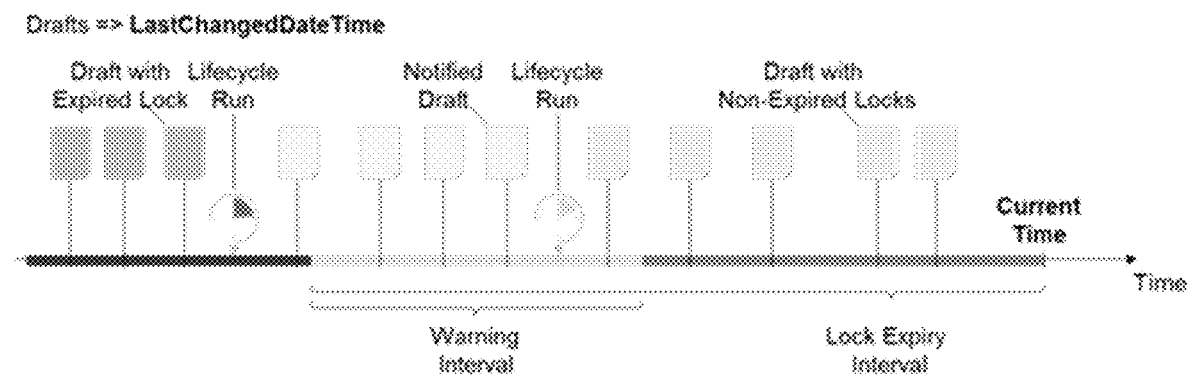
FIG. 13 is a timeline illustrating expiry phases for enqueue locks according to some embodiments.

FIG. 13 illustrates enqueue lock expiration according to some embodiments. The behavior of the enqueue lock expiration handler is described with respect to the relative expiry. In this scenario, the handler behavior is based on the LastChangeDateTime attribute and the configured intervals. All locks of draft documents that are frequently modified do not expire. After a certain time of inactivity (i.e., Enqueue Lock Expiry Interval—Warning Interval) the processors of all draft documents with expiring locks are notified once at the next lifecycle run. This also applies for the expired locks once the modification timestamp has become older than the current time minus the enqueue lock expiry interval.

Figure 14:
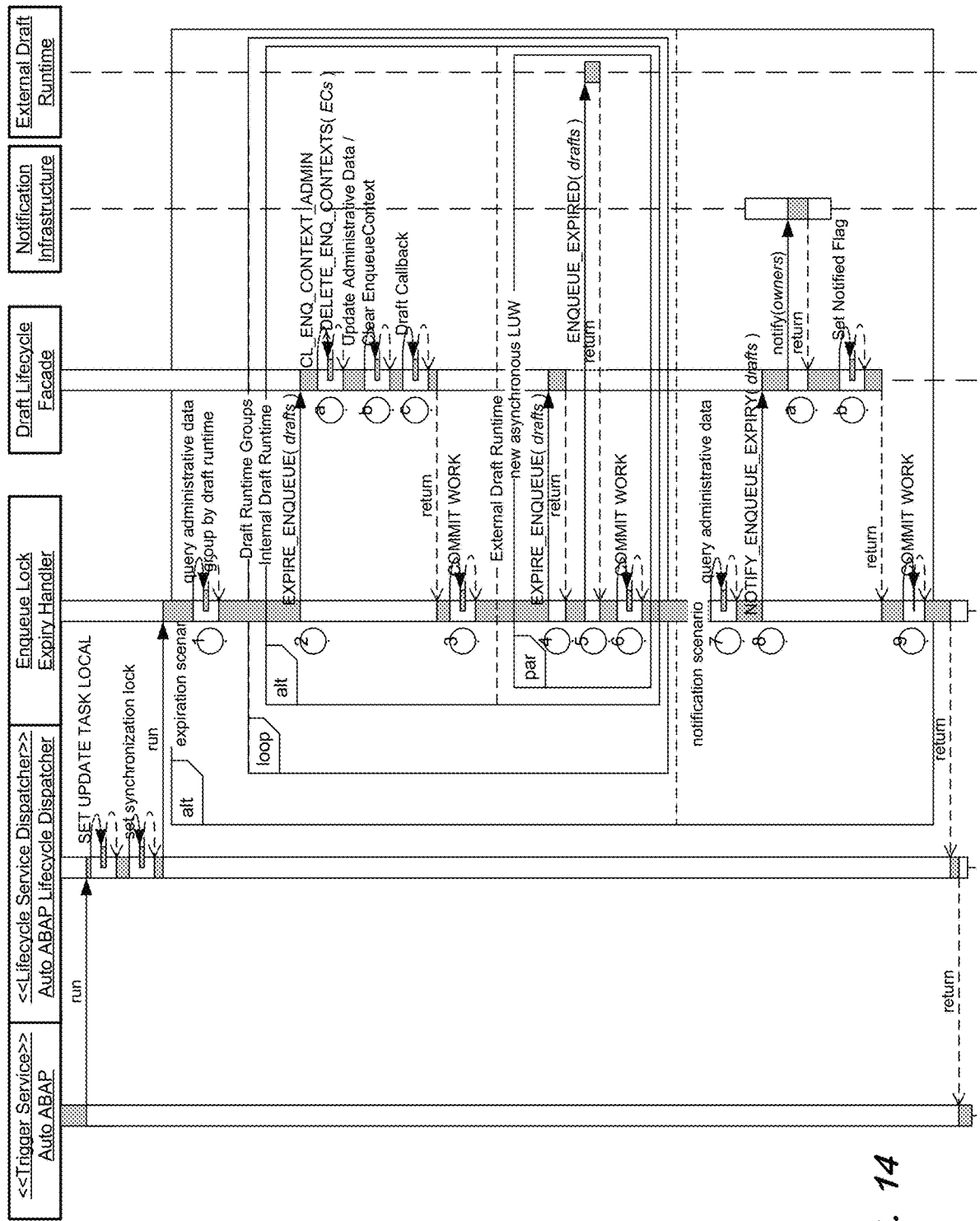
FIG. 14 is a sequence diagram for enqueue lock expiry according to some embodiments.

FIG. 14 is a sequence diagram for enqueue lock expiration according to some embodiments. According to the sequence diagram, and as described herein, durable enqueue locks are released once for all draft documents which have been inactive for longer than a predetermined interval.

Initially, all draft administrative data is selected in which Draft Administrative Data →EnqueueContext is not initial and Draft Administrative Data→LastChangedDateTime <Current Time-[Lock Expiry Interval$_{Global}$|Lock Expiry Interval$_{Draft\ Type}$]

If interval configuration per draft type is supported, these individual intervals may be joined instead of using fixed global intervals. The selected draft administrative data entries are grouped by draft runtimes.

Next, based on the entries of the application infrastructure draft runtime, the Draft Lifecycle Façade is called to expire the enqueues. Specifically, enqueue locks for a list of enqueue contexts are deleted, the EnqueueContext is cleared, the flag EnqueueExpiryIsNotified is reset to false, and the LastChangeDateTime is not updated. The changes are committed after application callback.

The Draft Lifecycle Façade is then called to expire the enqueues based on the entries of the external draft runtimes in a separate LUW as described above. The external draft runtime is called with a list of drafts whose enqueue context were expired, and the changes are committed. Notification to owners, processors or subscribed users about expired enqueue locks is part of the facade's method and is not shown in diagram.

Warning notifications shall be sent once for all drafts with expiring locks, independent of the draft runtime. All draft administrative data is selected in which Draft Administrative Data→EnqueueContext is not initial and Draft Administrative Data→LastChangedDateTime<Current Time-([Lock Expiry Interval$_{Global}$|Lock Expiry Interval$_{Draft\ Type}$]-[Lock Warning Interval$_{Global}$|Lock Warning Interval$_{Draft\ Type}$]) and Draft Administrative Data→LastChangedDateTime< Current Time-[Lock Expiry Interval$_{Global}$|Lock Expiry Interval$_{Draft\ Type}$] and Draft Administrative Data→LockExpiryIsNotified equals false. If interval configuration per draft type is supported, these individual intervals may be joined instead of using fixed global intervals.

The Draft Lifecycle Façade is called to notify owner about the expiring enqueues. Specifically, warning notification is sent to owners of exclusive drafts or to all admitted users of the shared draft, the flag EnqueueExpiryIsNotified is set to true, and the LastChangeDateTime is not updated. The changes are then committed.

In an "emergency mode" (e.g., due to a critical enqueue server resource situation), the dispatcher may call the enqueue lock expiry handler with an emergency flag set to true to force a release of enqueue locks. Such situations may be exceptional and rare. Thus, a selection of all drafts with enqueue contexts is appropriate. These enqueue contexts and their associated locks shall be passed to CL_ENQ_CONTEXT_ADMIN=>delete_enq_contexts( ) and released entirely.

A less drastic approach may be introduced using an emergency release quota (relative or absolute). This may require an additional API to determine the number of locks associated with enqueue contexts. A list of enqueue contexts sorted by LastChangeDateTime could be narrowed to the number of entries needed to fulfil the quota. CL_ENQ_CONTEXT_ADMIN=>delete_enq_contexts would then be called with that sublist of enqueue contexts.

Figure 15:
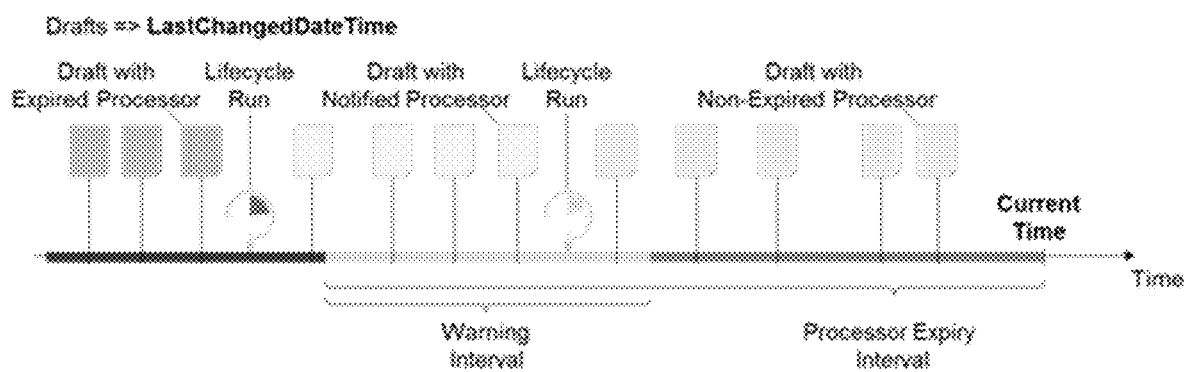
FIG. 15 is a timeline illustrating expiry phases for processors according to some embodiments.

FIG. 15 illustrates processor expiration according to some embodiments. In a shared draft, the current processor might unintentionally block other admitted users. To prevent such situations, the processor shall be released by a processor expiration handler. Subsequently, the behavior of the handler is described for the relative expiry, and is based on the LastChangeDateTime attribute and the configured intervals.

The processor does not expire in shared draft documents as long as the processor frequently modifies the shared draft documents. However, after a certain time of inactivity (e.g., Processor Expiry Interval—Warning Interval), the expiring processors of draft documents are notified once at the next lifecycle run. This applies for the expired processors once the modification timestamp has become older than the current time minus the processor expiry interval. Drafts without exclusive processors may be indicated by a special value (<vacancy token>) in the InProcessByUser Attribute.

Figure 16:
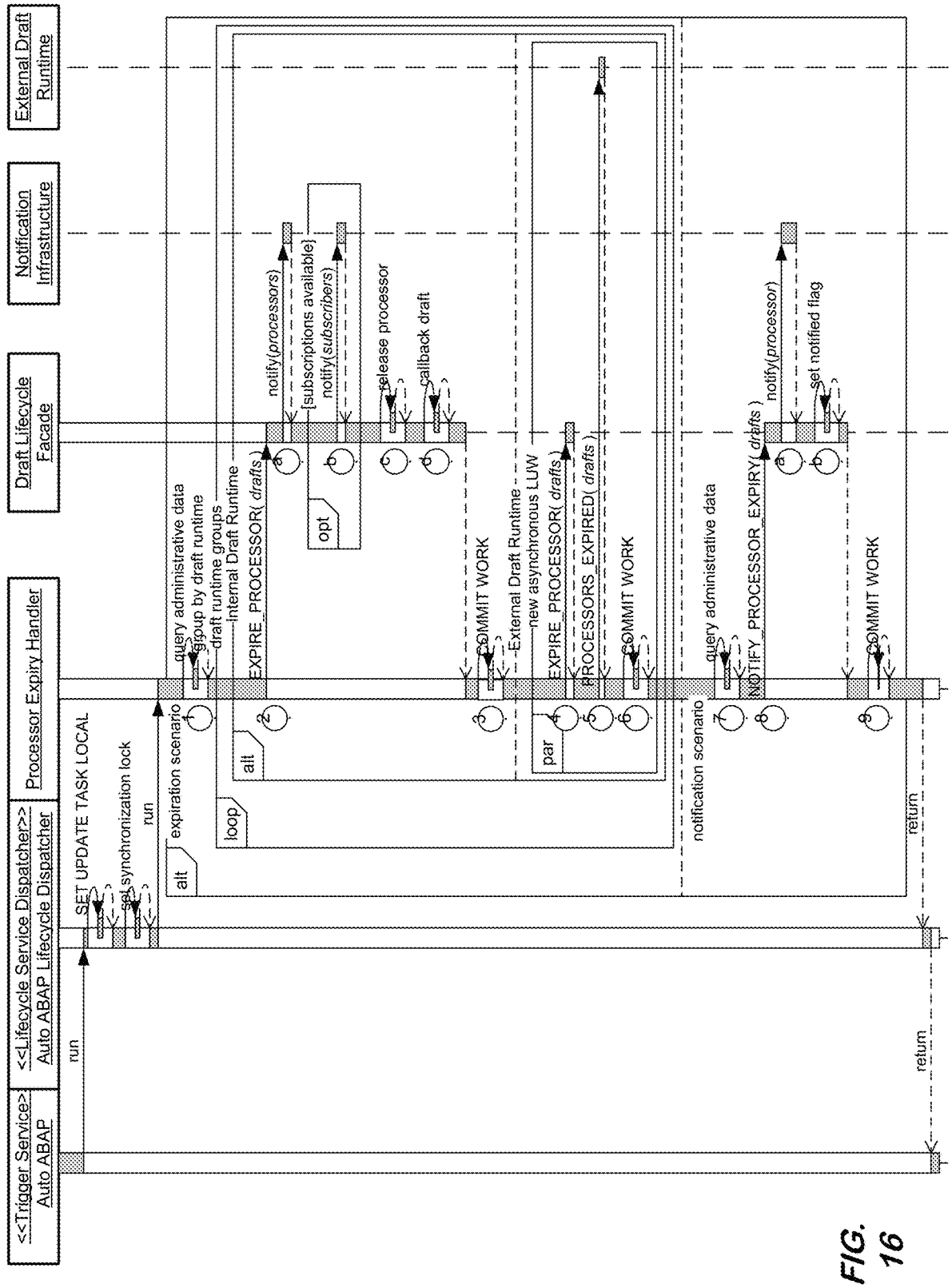
FIG. 16 is a sequence diagram for processor expiry according to some embodiments.

FIG. 16 is a sequence diagram for processor expiry according to some embodiments. According to the sequence diagram, and as described herein, processors are released once for all draft documents which have been inactive for longer than a predetermined interval.

As shown, all draft administrative data is selected in which Draft Administrative Data→InProcessByUser is not initial and Draft Administrative Data→InProcessByUser does not equal <vacancy token> and Draft Administrative Data→LastChangedDateTime<Current Time-[Processor Expiry Interval$_{Global}$|Processor Expiry Interval$_{Draft\ Type}$]. Again, if interval configuration per draft type is supported, these individual intervals may be joined instead of using fixed global intervals.

Beginning with the entries of the application infrastructure draft runtime, the Draft Lifecycle Façade is called to expire the processors. This operation may include sending a notification to the expired processor of shared drafts, sending a notification to all admitted users of a shared draft that have subscribed to the processor vacant event. The processor is then released (e.g., by setting InProcessByUser to <vacancy token>), the flag ProcessorExpiryIsNotified is reset to false, and LastChangeDateTime not updated. Finally, a callback to the draft document(s) is issued and the changes are committed.

Next, the Draft Lifecycle Façade is called as described above to expire the processor in a separate LUW for the entries of external draft runtimes. The external draft runtime is called with a list of drafts whose processors were expired, and the changes are committed.

Warning notifications may sent to the processor once for all drafts having an expiring processor. To do so, all draft administrative data are selected in which Draft Administrative Data→InProcessByUser is not initial and Draft Administrative Data→InProcessByUser not equals<vacancy token> and Draft Administrative Data→LastChangedDateTime<Current Time-([Processor Expiry Interval$_{Global}$|Processor Expiry Interval$_{Draft\ Type}$]-[Processor Warning Interval$_{Global}$|Processor Warning Interval$_{Draft\ Type}$]) and Draft Administrative Data→LastChangedDateTime>Current Time-[Processor Expiry Interval$_{Global}$|Processor Expiry Interval$_{Draft\ Type}$] and Draft Administrative Data→ProcessorExpiryIsNotified equals false. As before, if interval configuration per draft type is supported, these individual intervals may be joined instead of using fixed global intervals.

The Draft Lifecycle Façade is called to notify owners about expiring processors by sending a warning notification to the processor of shared drafts and setting the flag ProcessorExpiryIsNotified to true, without updating the LastChangeDateTime. The changes are then committed.

Figure 17:
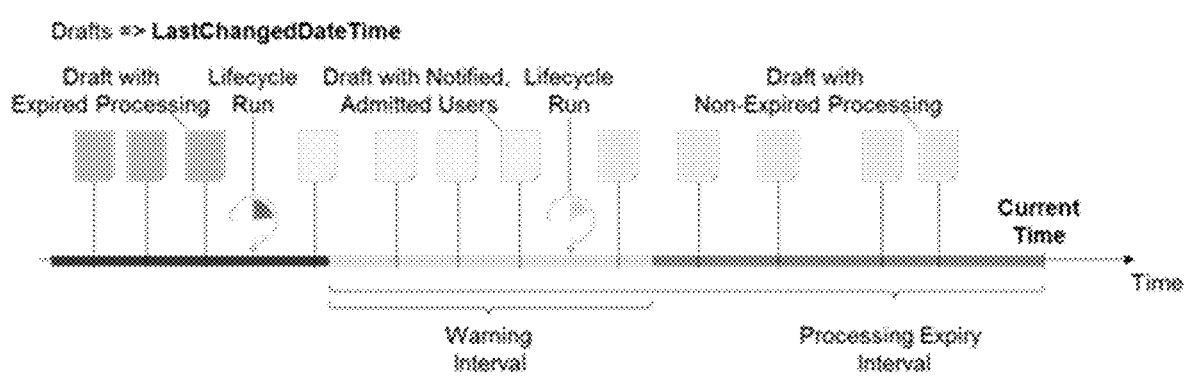
FIG. 17 is a timeline illustrating expiry phases for processing according to some embodiments.

An exclusive draft or a shared draft might unintentionally block other authorized users. To address such situations, the processor is cleared by a processing expiration lifecycle service handler. The behavior of the handler is described for the relative expiry. In this scenario, the behavior is based on the LastChangeDateTime attribute and the configured intervals as illustrated in FIG. 17.

As shown, a draft's processing does not expire as long as it is frequently modified. However, after a certain time of inactivity [Processing Expiry Interval—Warning Interval] the admitted users of draft documents with an expiring processing time are notified once at the next lifecycle run. The same notification occurs for all admitted users once the processing expiry event occurs, that is, once the modification timestamp has become older than the current time minus the processing expiry interval.

Figure 18:
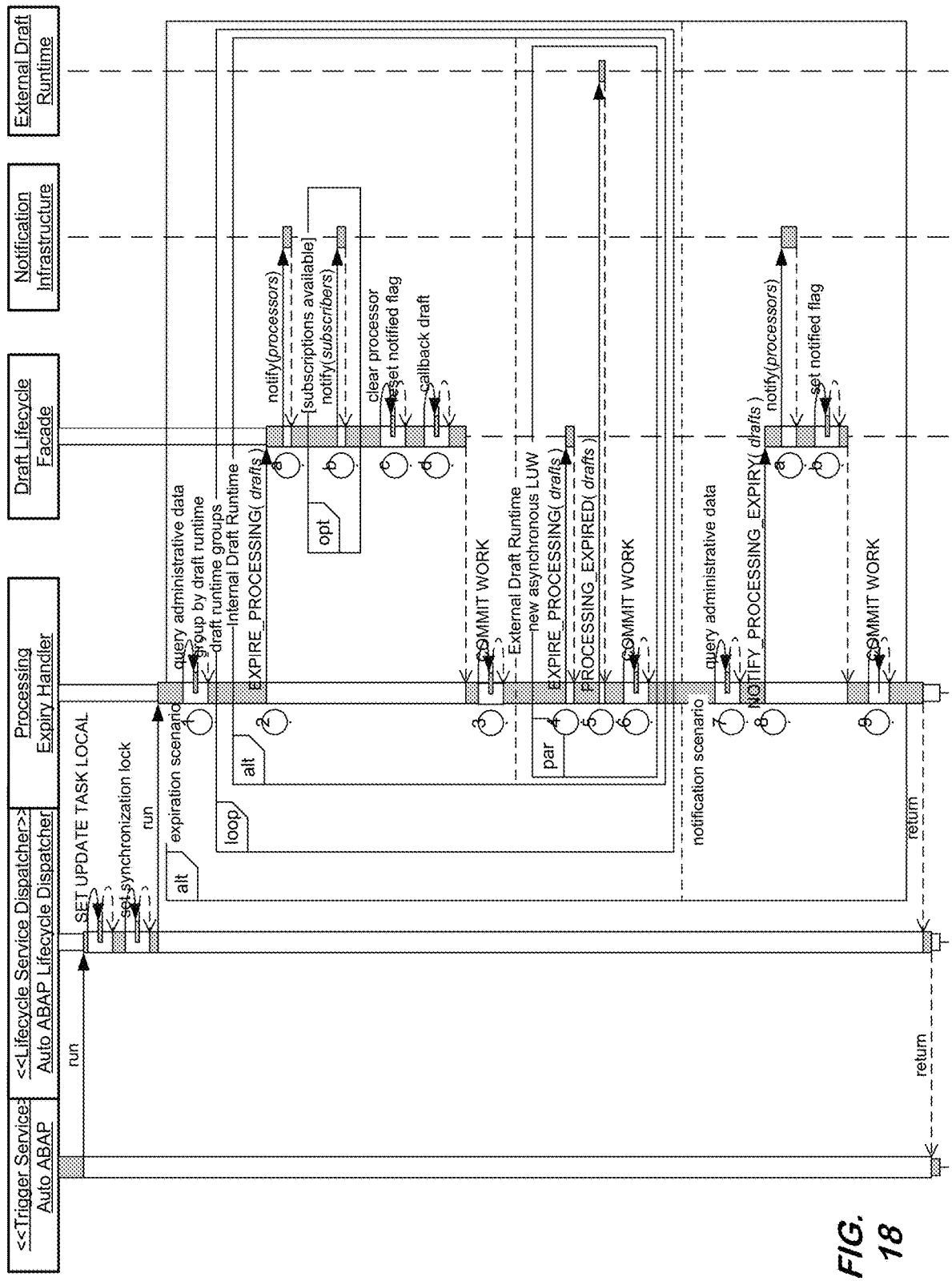
FIG. 18 is a sequence diagram for processing expiry according to some embodiments.

FIG. 18 is a sequence diagram for processing expiry of a lifecycle service handler according to some embodiments. As shown, processing shall be released once for all draft documents those are inactive for too long.

All draft administrative data are selected where Draft Administrative Data→InProcessByUser is not initial and Draft Administrative Data→InProcessByUser does not equal <vacancy token> and ((Draft Administrative Data→DraftIsKeptByUser equals true and Draft Administrative Data→LastChangedDateTime<Current Time-[Processing Expiry Interval$_{Global}$|Processing Expiry Interval$_{Draft\ Type}$]) or (Draft Administrative Data→DraftIsKeptByUser equals false and Draft Administrative Data→LastChangedDateTime<Current Time-[Not Kept Expiry Interval$_{Global}$|Not Kept Expiry Interval$_{Draft\ Type}$])). If interval configuration per draft type is supported, join individual intervals instead of fixed global intervals.

Proceeding with entries of the application infrastructure draft runtime, the Draft Lifecycle Façade is called to expire the processing. In particular, a notification is sent to the expired processor of exclusive drafts, or to all admitted processors of shared drafts. A notification is then sent to all authorized users of a shared draft that have subscribed to the processing expiry event. The processor is cleared (by setting InProcessByUser to initial), the flag ProcessingExpiryIsNotified is set to false, LastChangeDateTime is not updated, and a callback to the draft document(s) is issued.

The changes are committed. Next, proceeding with entries of external draft runtimes in a separate LUW, the Draft Lifecycle Façade is called to expire the processing (as described above), the external draft runtime is called with a list of drafts in which processing has expired, and the changes are committed.

Warning notifications are sent to the admitted users once for all drafts with an expiring processing interval. Initially, all draft administrative data are selected where Draft Administrative Data→InProcessByUser is not initial and Draft Administrative Data→InProcessByUser not equals<vacancy token> and Draft Administrative Data→ProcessingExpiryIsNotified equals false and ((Draft Administrative Data→DraftIsKeptByUser equals true and Draft Administrative Data→LastChangedDateTime<Current Time-([Processing Expiry Interval$_{Global}$|Processing Expiry Interval$_{Draft\ Type}$]-[Processing Warning Interval$_{Global}$|Processing Warning Interval$_{Draft\ Type}$])) or (Draft Administrative Data→DraftIsKeptByUser equals false and Draft Administrative Data→LastChangedDateTime<Current Time-([Not Kept Expiry Interval$_{Global}$|Not Kept Expiry Interval$_{Draft\ Type}$]-[Not Kept Warning Interval$_{Global}$|Not Kept Warning Interval$_{Draft\ Type}$]))).

The Draft Lifecycle Façade is called to notify owners about expiring processing by sending a warning notification to the processor of an exclusive draft or to all admitted processors of a shared draft, setting the flag ProcessingExpiryIsNotified to true, and by not updating the LastChangeDateTime. The changes are then committed.

An eTag verification handler ensures that edit draft documents are still valid and that no concurrent modification occurred on the respective active documents causing a change of their eTags. Invalidated draft documents are cancelled and deleted such that they no longer block other users from editing the active document.

Figure 19:
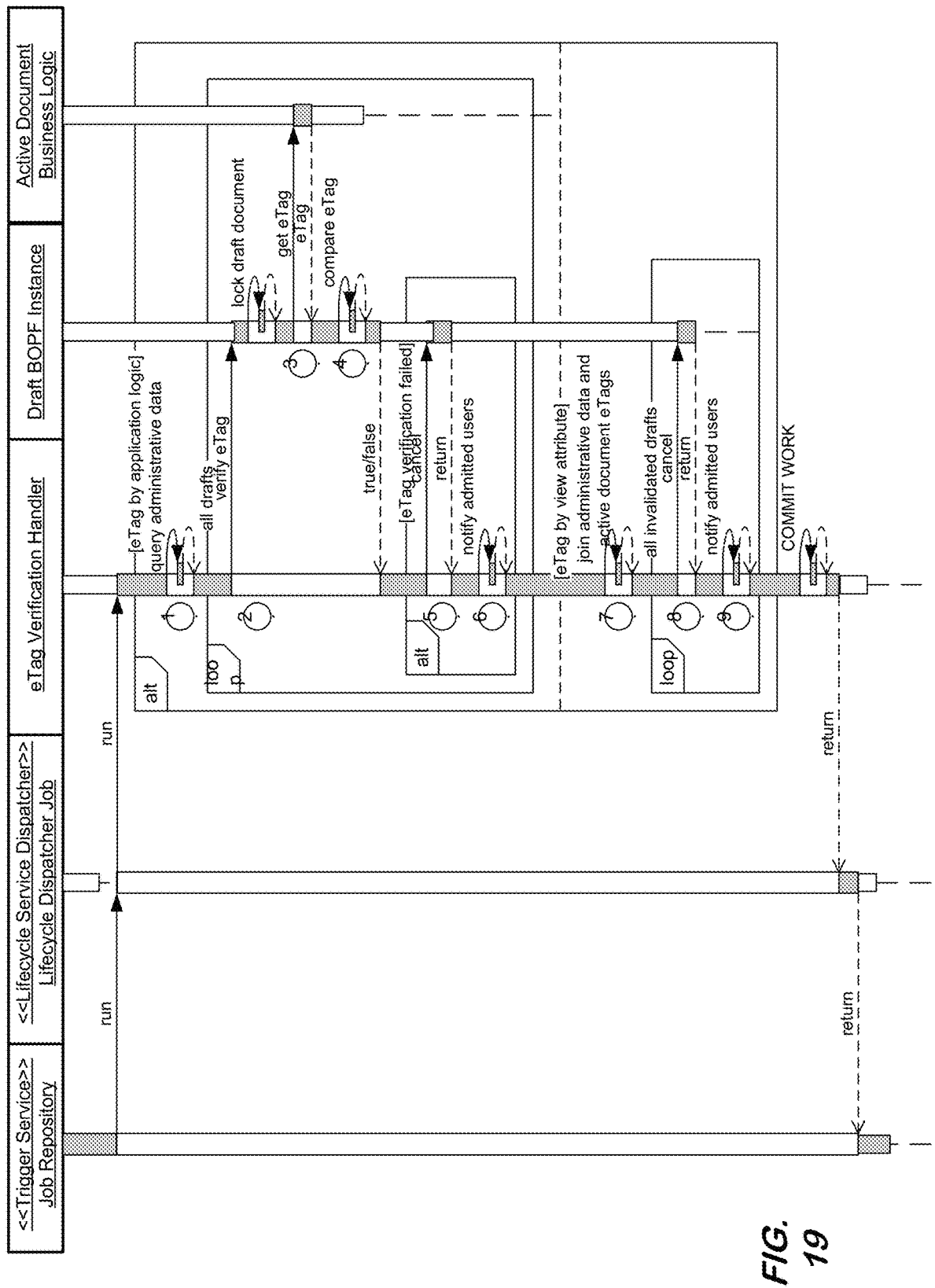
FIG. 19 is a sequence diagram for eTag verification according to some embodiments.

FIG. 19 is a sequence diagram of an eTag verification handler according to some embodiments. The handler may operate in two variants, each of which will be described below. Variant I performs individual eTag determination logic per draft and corresponding active document. Variant II incorporates a join of views for active document and draft administrative data whenever the active documents' eTag can be covered by a CDS view attribute. This direct selection of relevant (invalidated) drafts results in performance benefits.

According to a specific example of Variant I, all draft administrative data are selected and the eTag for each draft is verified. The active document's eTag is verified by application logic callback (e.g., by deriving a content hash). The active document's eTag is compared to ActiveDocumentETag in the draft's administrative data. All drafts which are determined to be invalid by the comparison are cancelled, and the admitted users are notified.

Variant II may include selection of draft administrative data joined with active document view and an eTag mismatch condition (per draft entity type). All drafts with mismatching eTags are cancelled, and the admitted users are notified.

Figure 20:
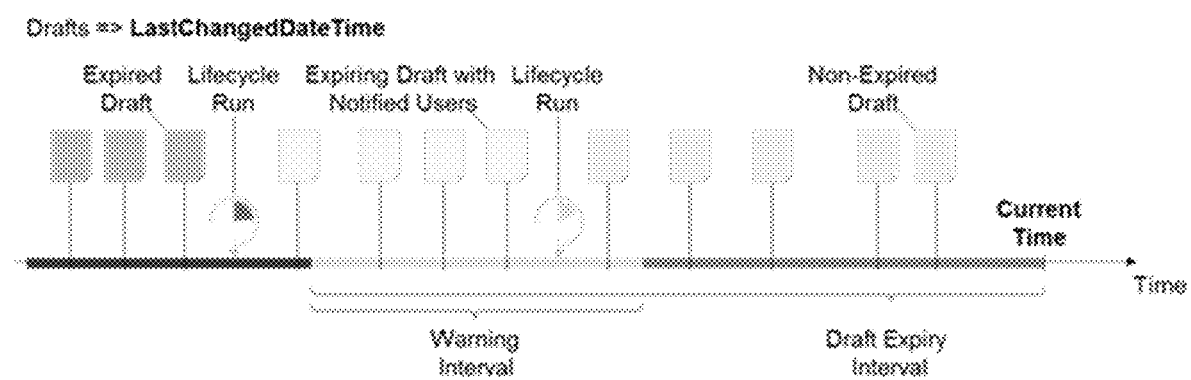
FIG. 20 is a timeline illustrating expiry phases for drafts according to some embodiments.

Although optimistically locked draft documents do not block any other authorized users and provide the ability to resume the processing after a long time, they should not exist infinitely (due to, e.g., data privacy concerns, resource limitations). These documents should therefore be cancelled and deleted after an inactivity period, e.g., one year. FIG. 20 illustrates draft expiration according to some embodiments.

A draft does not expire as long as it is regularly modified. However, after a certain time of inactivity [Draft Expiry Interval—Warning Interval], the admitted users of expiring draft documents are notified once, at the next lifecycle run. This applies for all admitted users once the draft expiry event occurs, i.e., when the modification timestamp has become older than the current time minus the draft expiry interval.

Figure 21:
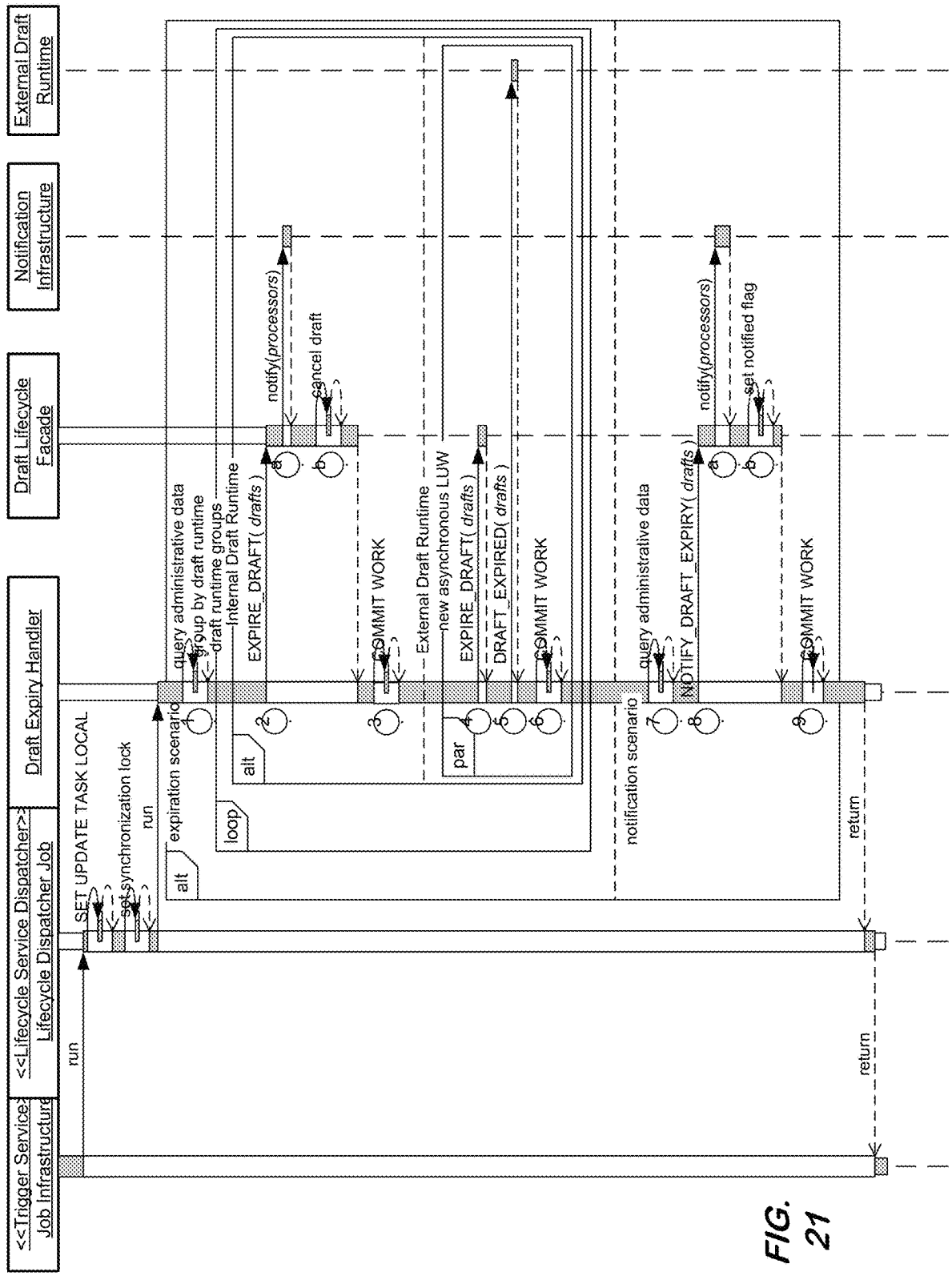
FIG. 21 is a sequence diagram for draft verification according to some embodiments.

FIG. 21 is a sequence diagram for a draft expiry handler according to some embodiments. According to the diagram, draft documents that are inactive for too long are cancelled and deleted. First, all draft administrative data are selected where Draft Administrative Data→LastChangedDateTime<Current Time-[Draft Expiry Interval$_{Global}$|Draft Expiry Interval$_{Draft\ Type}$]. The selected draft documents are cancelled, which deletes them. A notification is sent to all admitted users (i.e., in the case of shared drafts) or to the owner (i.e., in the case of an exclusive draft) of the expired drafts.

Warning notifications are sent to the admitted users once for all expiring drafts. To do so, all draft administrative data are selected where Draft Administrative Data→LastChangedDateTime<Current Time-([Draft Expiry Interval$_{Global}$|Draft Expiry Interval$_{Draft\ Type}$]-[Draft Warning Interval$_{Global}$|Draft WarningInterval$_{Draft\ Type}$]) and Draft Administrative Data→LastChangedDateTime> Current Time-[Draft Expiry Interval$_{Global}$|Draft Expiry Interval$_{Draft\ Type}$] and Draft Administrative Data→DraftExpiryIsNotified equals false. A warning notification regarding expiring drafts is sent to their admitted users (i.e., in the case of shared drafts) or to the owner (i.e., in the case of an exclusive draft). The flag DraftExpiryIsNotified set to true, and the LastChangeDateTime is not updated.

Figure 22:
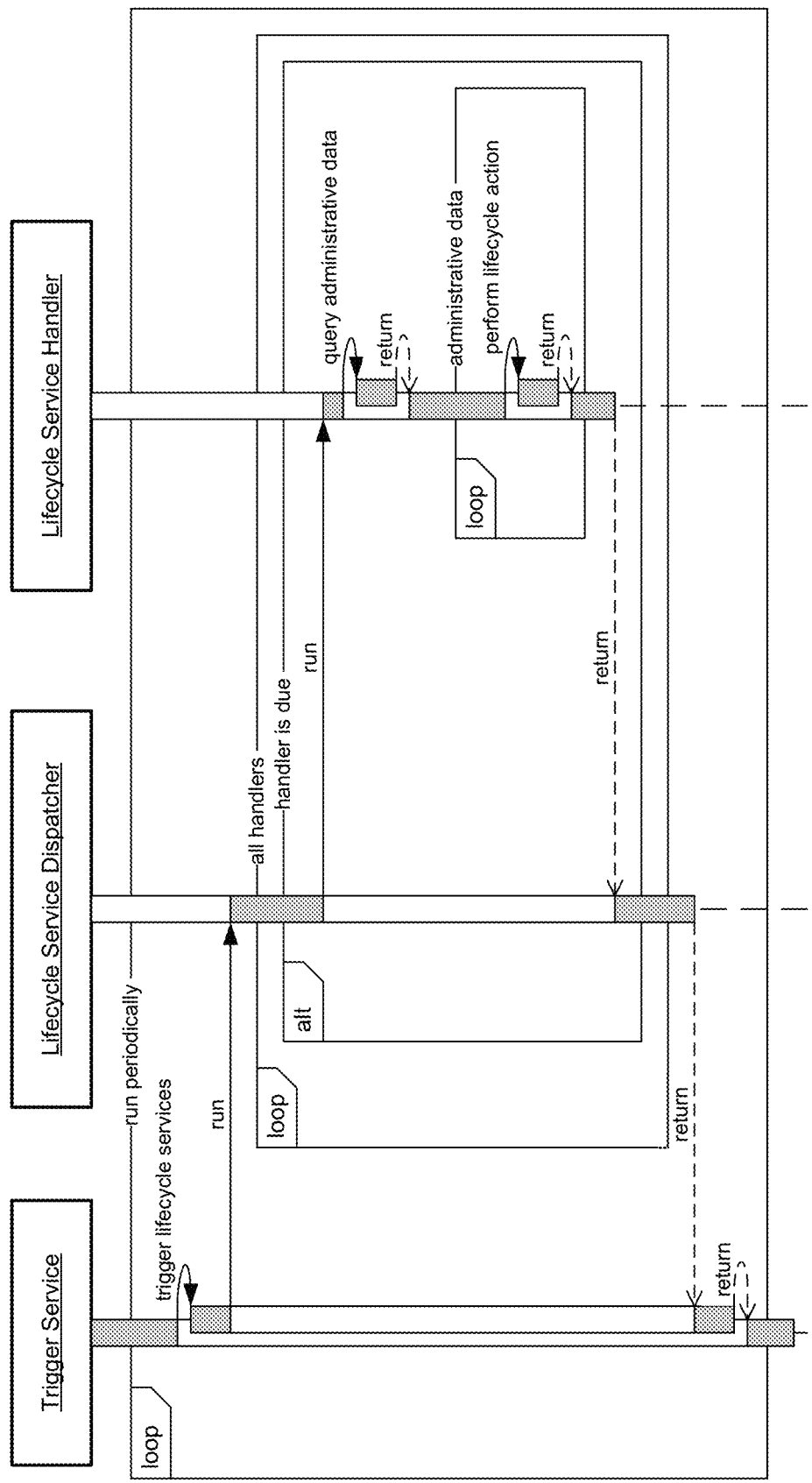
FIG. 22 is a sequence diagram of lifecycle services trigger, dispatcher and handler processing according to some embodiments.

As illustrated in FIG. 22, a lifecycle service trigger service may handle the periodic running of lifecycle services. The trigger may run at a certain frequency and invoke an appropriate lifecycle service handler depending upon the current scenario as described above. Instead of directly registering the handlers to the trigger mechanism, a central lifecycle service dispatcher may be called by the trigger service. The dispatcher then invokes the registered handlers, potentially at a lower frequency which is individual to each handler. The dispatcher is called at the highest frequency, set in the trigger service.

Embodiments may employ two different trigger mechanisms, a guaranteed, periodic trigger which invokes a dispatcher at high frequency (e.g., minutes), and a job-like, periodic trigger which invokes a dispatcher at low frequency (e.g., hours or days).

Figure 23:
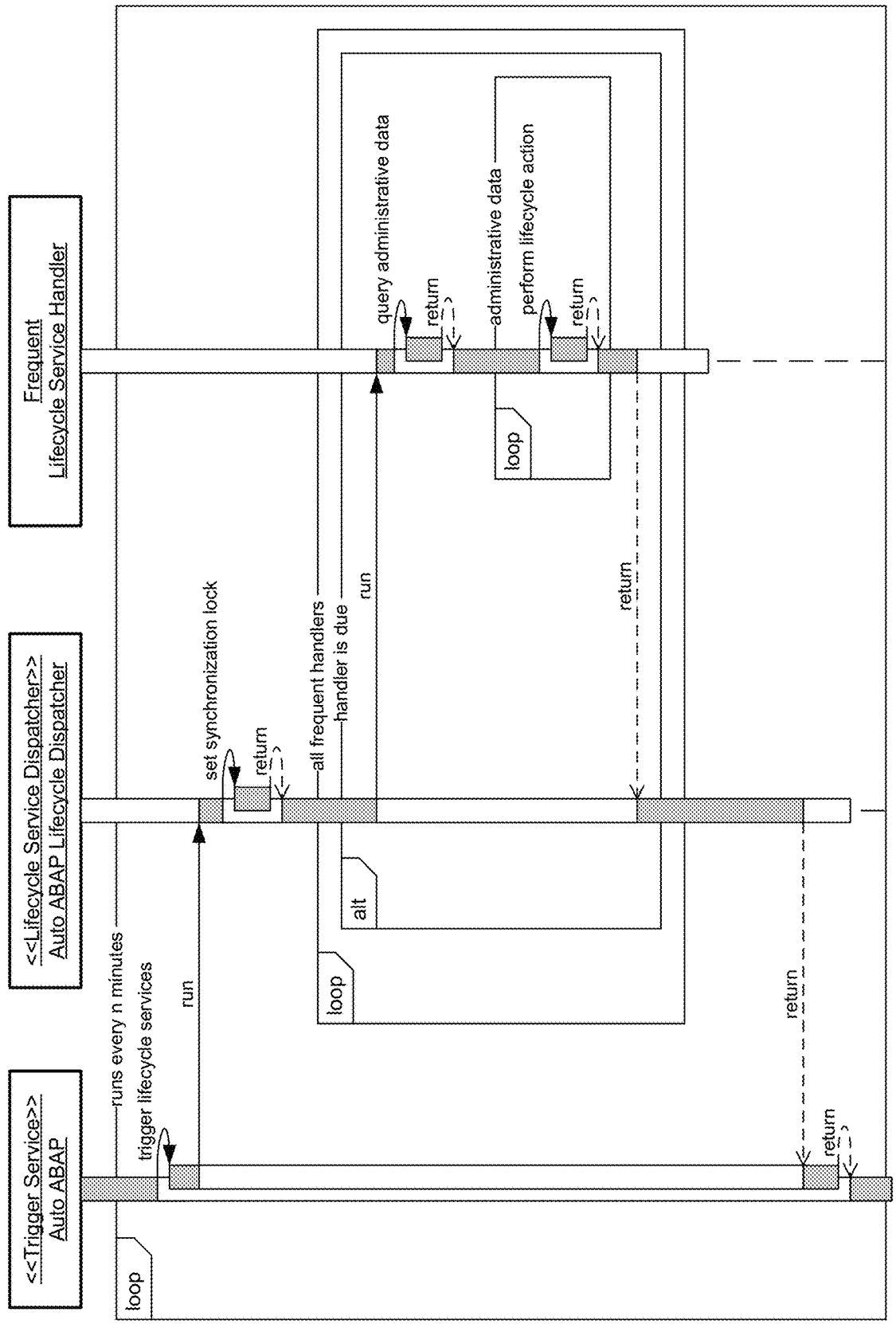
FIG. 23 is a sequence diagram of guaranteed frequent trigger, dispatcher and handler processing according to some embodiments.

The guaranteed, frequent trigger mechanism serves lifecycle service handlers dealing with time- and resource-critical expirations. FIG. 23 illustrates such a trigger service, lifecycle service dispatcher and handler sequence according to some embodiments. The trigger service may be implemented via Auto ABAP to ensure reliable invocation after a configurable period of time (e.g., 5 minutes). Auto ABAP runs once per server (i.e., it is not client-specific). To avoid parallel execution on different servers, a central lock object is managed by the lifecycle infrastructure. The triggered lifecycle service dispatcher and the invoked handlers perform the corresponding action as a technical user. Thus, no authority checks must be executed in the performed lifecycle action logic. In addition, a timeout (e.g., 1 minute) may be employed to limit the dispatcher processing time.

Each handler may implement the retrieval of all relevant administrative data entities with a single selection. The handler may have to differentiate between expiring and expired events. Furthermore, the taken action may be a mass-enabled operation. The following table lists the lifecycle service handlers that may be invoked by the Auto ABAP trigger at high frequency and in a guaranteed manner:

| Lifecycle Service Handler | Interval |
| --- | --- |
| Enqueue Lock Expiration Handler | Same frequency as Auto ABAP Trigger |
| Processor Expiration Handler | Same frequency as Auto ABAP Trigger |
| Processing Expiration Handler | Same frequency as Auto ABAP Trigger |

According to some embodiments in which the Enqueue Server is critical, the Enqueue Lock Expiration Handler runs with priority (i.e., it is the first handler triggered by the lifecycle dispatcher).

Figure 24:
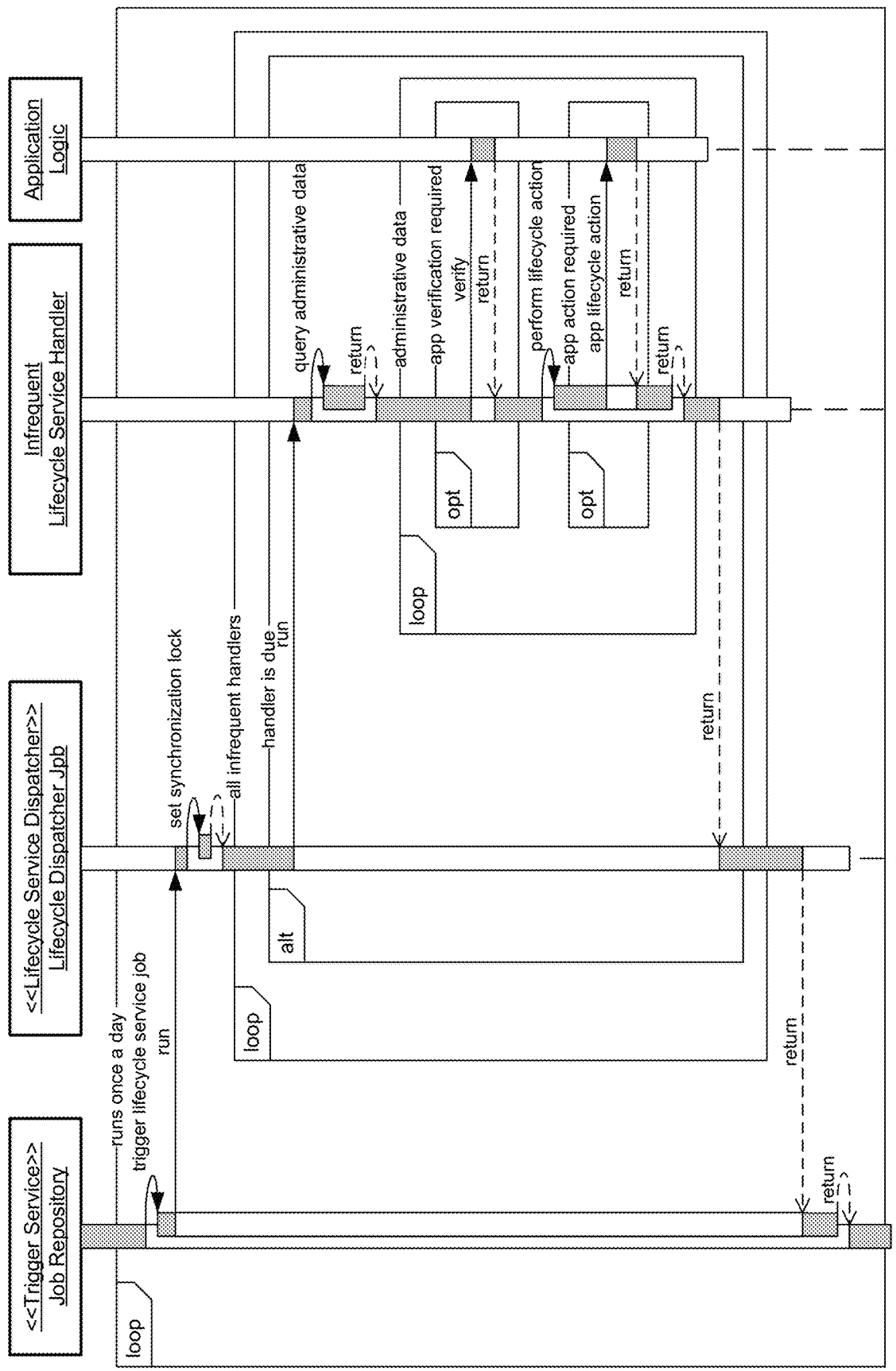
FIG. 24 is a sequence diagram of job-like infrequent trigger, dispatcher and handler processing according to some embodiments.

As described above, the job-like, infrequent trigger mechanism may serve lifecycle service handlers at low frequency. The trigger service may be implemented via job repository with a recurring job being executed once a day (e.g., at night). FIG. 24 is a diagram of a job repository trigger, dispatcher job and handler sequence according to some embodiments.

As the lifecycle action may require invoking application logic via a callback interface, authority checks are considered (e.g., if the user configured for the job has the corresponding authority). Moreover, the job is executed in a client-specific way.

| Lifecycle Service Handler | Interval |
| --- | --- |
| eTag Verification Handler | Same frequency as trigger |
| Draft Expiration Handler | Once a day |

Configurations are required on various different levels of the lifecycle services system described herein. For example, configurations are required for the trigger mechanisms, for the lifecycle services dispatcher, and for each of the lifecycle services and their corresponding lifecycle scenario.

The guaranteed, frequent trigger uses a fixed registration of the lifecycle service dispatcher. The triggering interval is configurable on the server level. The interval may be set as a value in minutes, delivered with a default interval which can be adjusted by the customer. A technical user may be configurable, and a second configurable interval may control the maximum dispatcher processing time per invocation.

The infrequent job repository trigger requires the lifecycle dispatcher job to be scheduled. The default settings may include a recurring interval set to once per day, with a start time at night. A technical user may be configurable, with the job schedule times being adjustable by the customer.

For the dispatcher service, all lifecycle service handlers that frequently run are registered with the lifecycle service dispatcher in a fixed setting. A secondary interval per handler may be used, that reduces the invocation frequency in the dispatcher compared to the original trigger's frequency.

For the dispatcher job, all lifecycle service handlers that frequently run are registered with the lifecycle service dispatcher in a fixed setting. A secondary interval per handler may be used that reduces the invocation frequency in the dispatcher compared to the original trigger's frequency.

The intervals taken into account by the lifecycle service handlers may be configurable at design time and by the customer at installation time. For each lifecycle scenario and event there may be a global default that can be specifically overwritten per draft entity type. The smallest expiration interval may be 1 minute.

| CDS Attribute | DB Field | Type |
| --- | --- | --- |
| DraftEntityType (primary key) | DRAFT_ENTITY | SDRAFT_ENTITY_NAME |
| | The entity type of the configured draft root entity | |
| ExpiryEventType (primary key) | EXPIRY_DURATION | SDRAFT_EXPIRY_EVENT |
| | The expiration event type given by enumeration | |
| | Enqueue_Expiry_Notification | 1 |
| | Relative_Enqueue_Expiry | 2 |
| | Absolute_Enqueue_Expiry | 3 |
| | Processor_Expiry_Notification | 11 |
| | Relative_Processor_Expiry | 12 |
| | Absolute_Processor_Expiry | 13 |
| | Processing_Expiry_Notification | 21 |
| | Relative_Processing_Expiry | 22 |
| | Absolute_Processing_Expiry | 23 |
| | Draft_Expiry_Notification | 31 |
| | Relative_Draft_Expiry | 32 |

-continued

| CDS Attribute | DB Field | Type |
|---|---|---|
| | Absolute_Draft_Expiry | 33 |
| | Not_Modified_Notification | 41 |
| | Not_Modified_Expiry | 42 |
| | Not_Kept_Notification | 43 |
| | Not_Kept_Expiry | 44 |
| ExpiryDurationInMinutes | EXPIRY_DURATION_MINS Interval in minutes. | SDRAFT_DURATION_MINUTES |
| ExpiryDurationInDays | EXPIRY_DURATION_DAYS Interval in days. | SDRAFT_DURATION_DAYS |
| ExternalDraftRuntime | EXPIRY_DURATION_MINS Interval in minutes. | SDRAFT_DRAFT_RUNTIME |

<global token> indicators for global defaults are proposed as follows:

| Draft Entity Type | Expiry Event Type | Expiry Duration In Minutes | Expiry Duration In Days | Description |
|---|---|---|---|---|
| <global token> | 1 | 5 | 0 | Interval for durable enqueue context expiry notification |
| <global token> | 2 | 15 | 0 | Interval for relative durable enqueue context expiry |
| <global token> | 3 | 15 | 0 | Interval for absolute durable enqueue context expiry |
| <global token> | 11 | 5 | 0 | Interval for processor expiry notification |
| <global token> | 12 | 15 | 0 | Interval for relative processor expiry |
| <global token> | 13 | 15 | 0 | Interval for absolute processor expiry |
| <global token> | 21 | 10 | 0 | Interval for processing expiry notification |
| <global token> | 22 | 30 | 0 | Interval for relative processing expiry |
| <global token> | 23 | 30 | 0 | Interval for absolute processing expiry |
| <global token> | 31 | 0 | 14 | Interval for draft expiry notification |
| <global token> | 32 | 0 | 180 | Interval for relative draft expiry |
| <global token> | 33 | 0 | 180 | Interval for absolute draft expiry |
| <global token> | 41 | 0 | 0 | Interval for not modified draft notification |
| <global token> | 42 | 5 | 0 | Interval for not modified draft expiry |
| <global token> | 43 | 5 | 0 | Interval for not kept draft notification |
| <global token> | 44 | 15 | 0 | Interval for not kept draft expiry |

Figure 25:
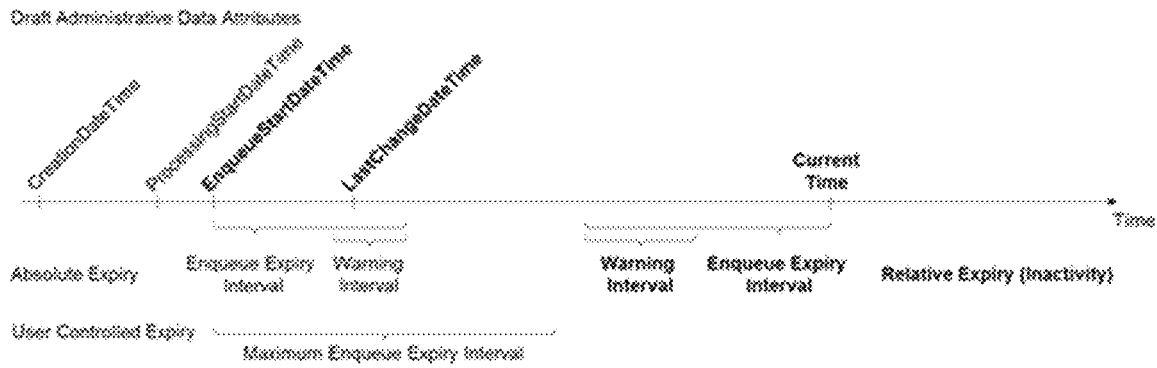
FIG. 25 is a diagram illustrating enqueue lock expiration intervals according to some embodiments.

FIG. 25 illustrates enqueue lock expiration lifecycle intervals according to some embodiments. The enqueue lock expiration handler may be configured for relative expiry after inactivity with an enqueue expiry interval and a warning interval for sending notifications in advance. The enqueue expiry and the warning interval may be configured and delivered as a global setting. In addition, the interval setting may be configurable on root entity level to individually overwrite the global setting. Both settings may be configurable by the customer as well. The same intervals may be used for absolute (i.e., fixed) enqueue lock expiry, in which a configuration flag per draft root entity specifies a relative or absolute (fixed) behavior.

In another approach, instead of fixed, configured intervals, the intervals could be dynamically adopted by some logic that takes into account whether a draft has been explicitly saved by a user or the 'value' of its content (e.g., the number of modifications collected in a draft document extends the expiry interval). To implement a user controlled expiration time (e.g., the user prolongs the default interval by UI capabilities), a maximum enqueue lock expiry may be added to prevent critical resource consumption.

Figure 26:
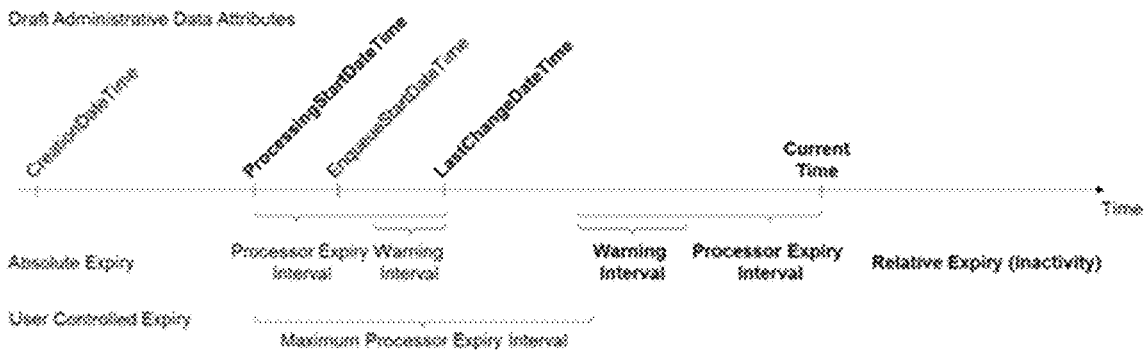
FIG. 26 is a diagram illustrating processor expiration intervals according to some embodiments.

FIG. 26 illustrates processor expiration lifecycle intervals according to some embodiments. The processor expiration handler for a shared draft document may be configured for relative expiry after inactivity, with a processor expiry interval and a warning interval for sending notifications in advance. The processor expiry and the warning interval may be configured and delivered as a global setting, may be configurable on root entity level to individually overwrite the global setting, and may be configurable by the customer as well. The same intervals may be used for absolute (fixed) processor expiration, in which a configuration flag per draft root entity specifies a relative or absolute (fixed) behavior.

Figure 27:
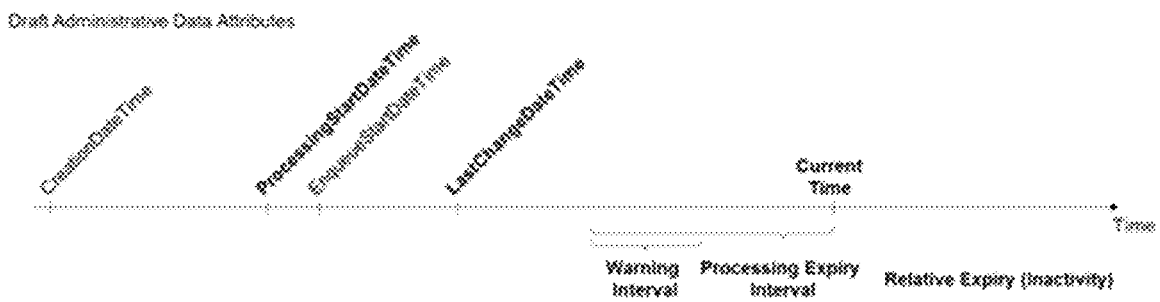
FIG. 27 is a diagram illustrating processing expiration intervals according to some embodiments.

FIG. 27 illustrates processing expiration lifecycle intervals according to some embodiments. The processing expiration handler for exclusive and shared draft document may be configured for relative expiry after inactivity with a processing expiry interval and a warning interval for sending notifications in advance.

The processing expiry and the warning interval may be configured and delivered as a global setting. In addition, the interval setting may be configurable on root entity level to individually overwrite the global setting. Both settings may be configurable by the customer as well. For a shared draft, the processing expiry interval may be longer than the processor expiry interval to ensure a step-wise document release (i.e., first to admitted users, then to other authorized users).

Although the eTag verification does not require an expiry interval, an option is to vary the frequency of verification for different draft roots. A corresponding configuration may impact the handler to exclude certain draft entity types from some job runs.

Figure 28:
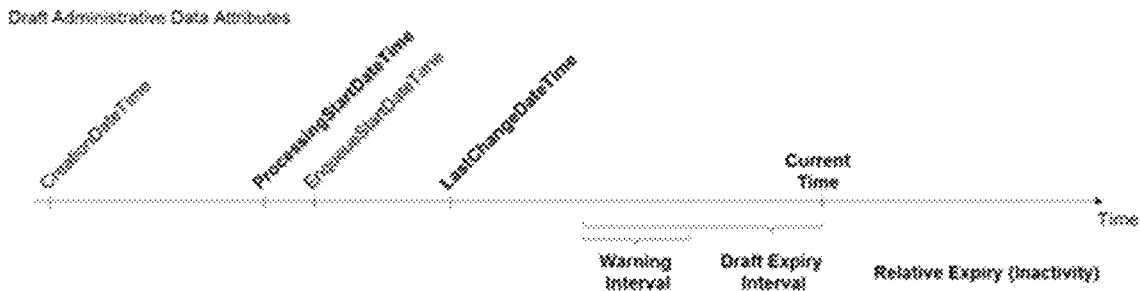
FIG. 28 is a diagram illustrating draft expiration intervals according to some embodiments.

FIG. 28 illustrates draft expiration lifecycle intervals according to some embodiments. The draft expiration handler for exclusive and shared draft documents may be configured for relative expiry after inactivity with a draft expiry interval and a warning interval for sending notifications in advance. It may be possible to set a longer interval (e.g., days or months).

In addition, the interval setting may be configurable on the root entity level to individually overwrite the global setting. It may be possible to set the interval to 0 (for any time value given by minutes or days), indicating an infinite expiry time (i.e., the draft never expires). Data privacy and table volume growth obligations should be considered before setting an infinite expiry time. Both settings may be configurable by the customer as well.

Figure 29:
FIG. 29 is a diagram illustrating non-modified draft expiration intervals according to some embodiments.

FIG. 29 illustrates lifecycle intervals for the expiration of unintentionally edited drafts according to some embodiments. The lifecycle service handler for expiring unintentionally edited draft documents may be configured for relative expiry after inactivity with two pairs of intervals. Embodiments may allow detecting, notifying and expiring the enqueue context as well as the processing of non-modified draft documents (i.e., where the CreationDateTime is equal to the Las tChangeDateTime).

Figure 30:
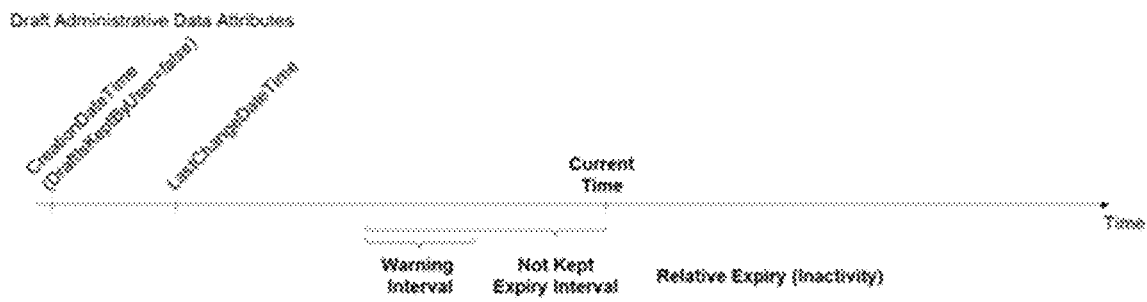
FIG. 30 is a diagram illustrating non-kept draft expiration intervals according to some embodiments.

A second pair of intervals may behave similarly for non-kept draft documents, i.e., where the DraftIsKeptBy-User indicator is equal to false. FIG. 30 illustrates lifecycle intervals for the expiration of non-kept drafts according to some embodiments. Again, the unintentional edit expiry and the warning interval may be configured and delivered as a global setting. The interval setting may be configurable on root entity level to individually overwrite the global setting, with both settings being configurable by the customer as well.

Figure 31:
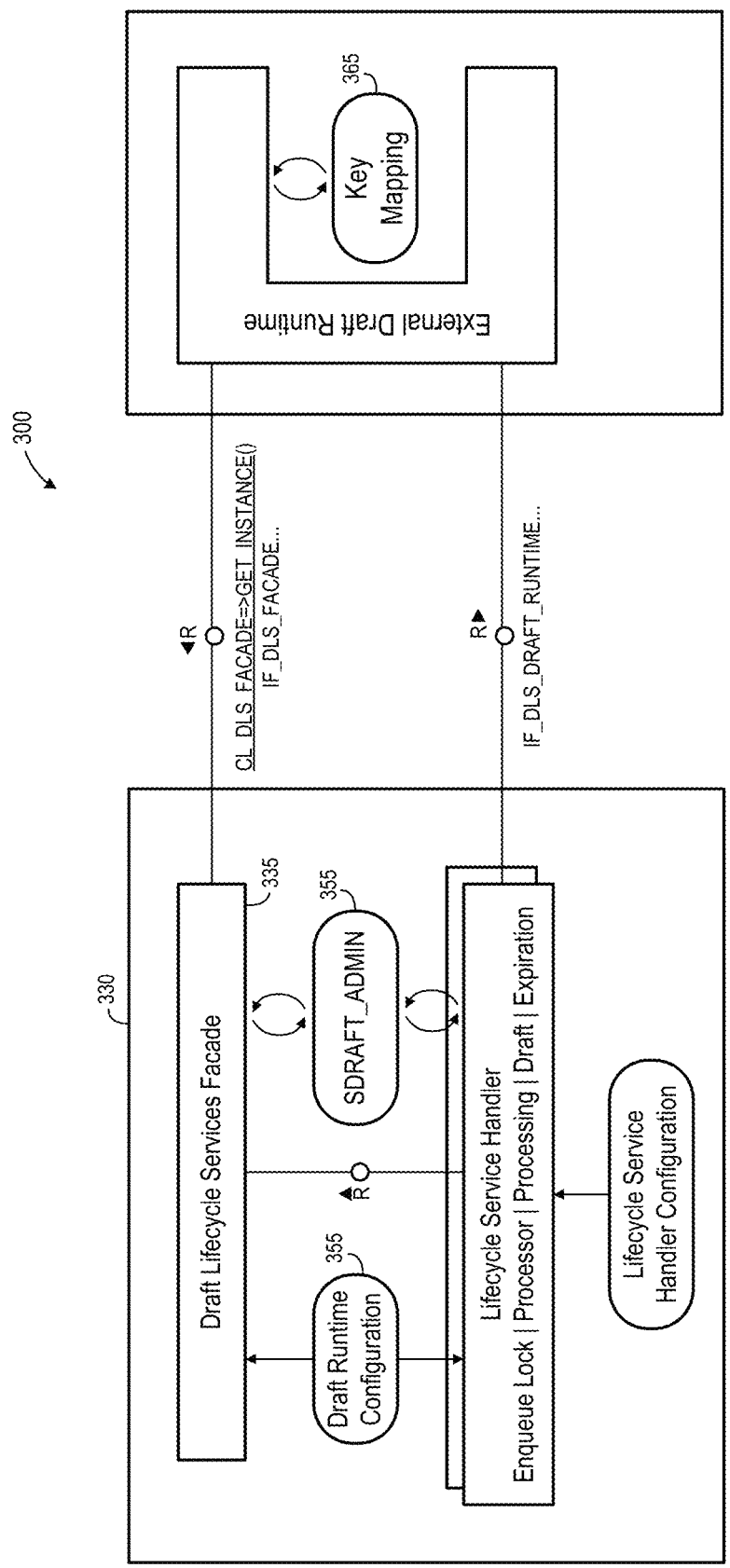
FIG. 31 is a block diagram of draft lifecycle services and an external draft runtime according to some embodiments.

FIG. 31 is a block diagram of draft lifecycle services and an external draft runtime according to some embodiments. The external draft runtime is invoked for corresponding draft administrative data entries. The regular behavior of the draft lifecycle facade is processed before invoking the external draft runtime for additional logic.

External draft runtimes are registered at design time with the lifecycle service infrastructure. There may be no specific lifecycle event configuration for the external draft runtime. Instead, the above-mentioned configuration tables may include an additional field for the draft runtime. The entity type and event type may be the key of the configuration table.

Figure 32:
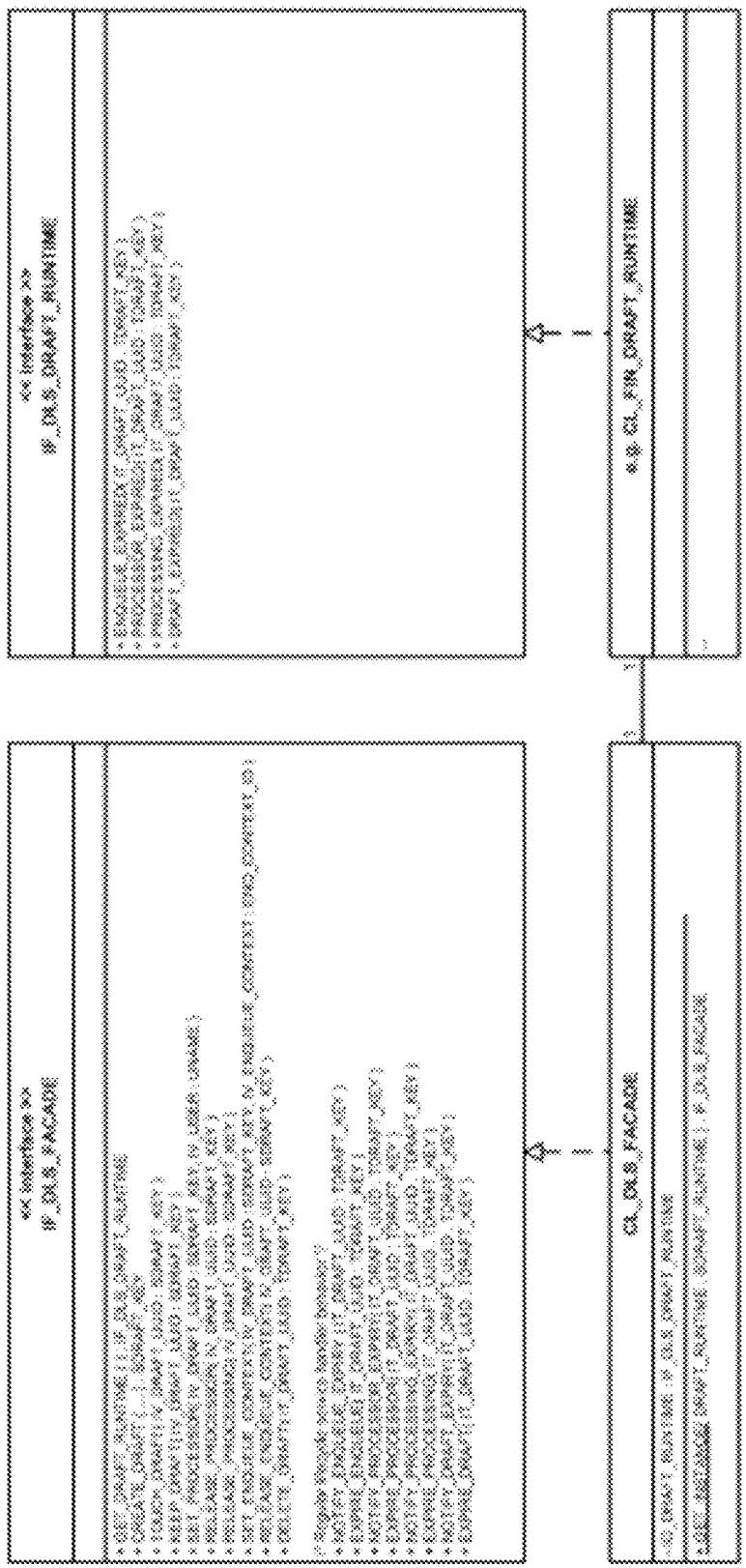
FIG. 32 illustrates interfaces for draft lifecycle services according to some embodiments.

The Draft Lifecycle Services Façade encapsulates the lifecycle behavior and provides an API for external access to the draft administrative data. An interface is also specified for implementation by external draft runtimes. FIG. 32 illustrates interfaces for the Draft Lifecycle Services. The interface allows the regular lifecycle service handlers to call the external runtime with notification and expiry events for corresponding entries in the draft administrative data table. The Draft Lifecycle Services Façade primarily encapsulates the access to the draft administrative data as the source for the Lifecycle Service Handlers.

Figure 33:
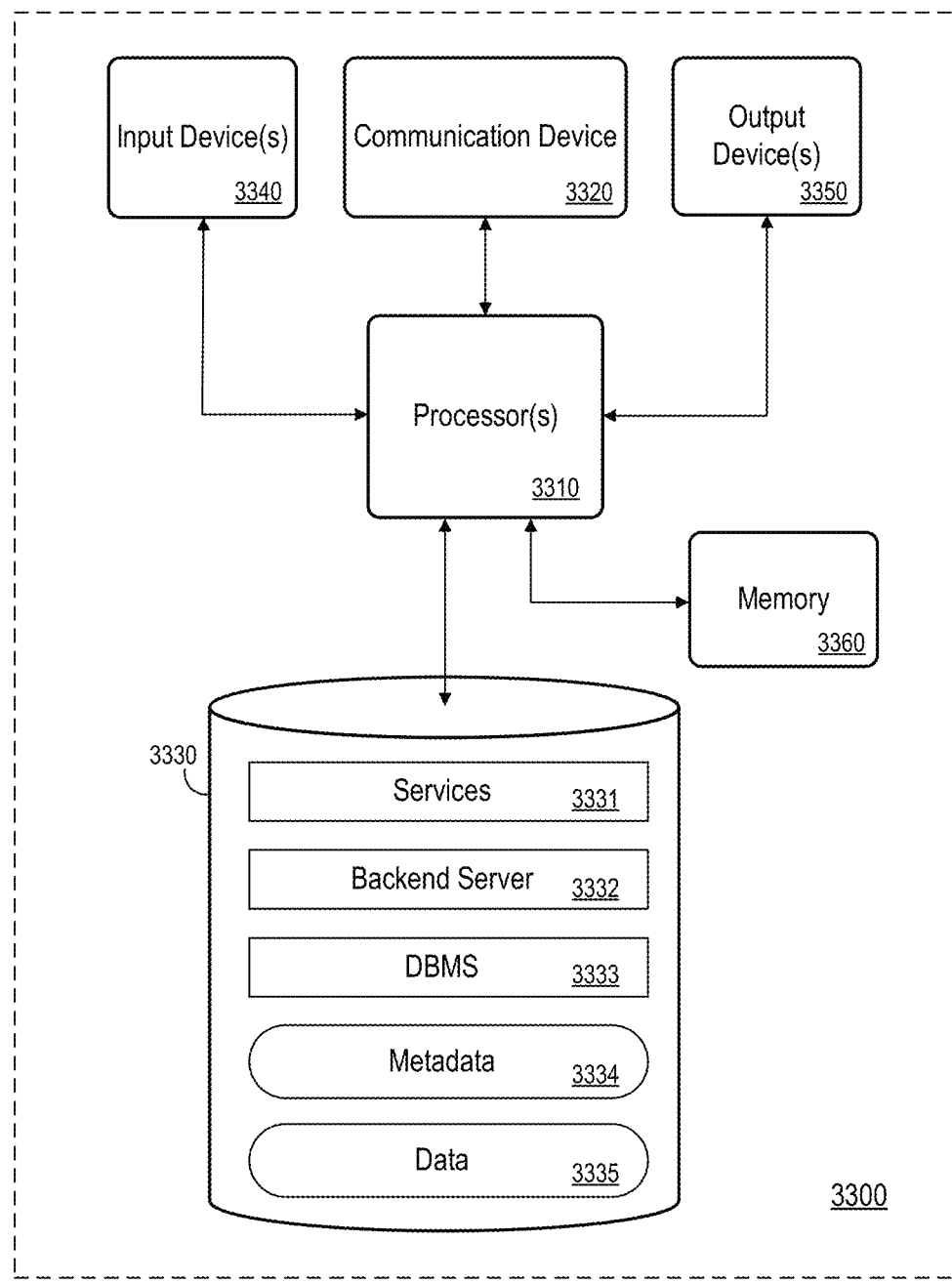
FIG. 33 is a block diagram of an apparatus according to some embodiments.

FIG. 33 is a block diagram of apparatus 3300 according to some embodiments. Apparatus 3300 may comprise a general-purpose computing apparatus and may execute program code to perform any of the functions described herein. Apparatus 3300 may comprise an implementation of back-end server 130, DBMS 120 and data store 110 of FIG. 10 in some embodiments. Apparatus 3300 may include other unshown elements according to some embodiments.

Apparatus 3300 includes processor 3310 operatively coupled to communication device 3320, data storage device 3330, one or more input devices 3340, one or more output devices 3350 and memory 3360. Communication device 3320 may facilitate communication with external devices, such as a reporting client, or a data storage device. Input device(s) 3340 may comprise, for example, a keyboard, a keypad, a mouse or other pointing device, a microphone, knob or a switch, an infra-red (IR) port, a docking station, and/or a touch screen. Input device(s) 3340 may be used, for example, to enter information into apparatus 3300. Output device(s) 3350 may comprise, for example, a display (e.g., a display screen) a speaker, and/or a printer.

Data storage device 3330 may comprise any appropriate persistent storage device, including combinations of magnetic storage devices (e.g., magnetic tape, hard disk drives and flash memory), optical storage devices, Read Only Memory (ROM) devices, etc., while memory 3360 may comprise Random Access Memory (RAM), Storage Class Memory (SCM) or any other fast-access memory.

Services 3331, backend server 3332 and DBMS 3333 may comprise program code executed by processor 3310 to cause apparatus 3300 to perform any one or more of the processes described herein. Embodiments are not limited to execution of these processes by a single apparatus.

Metadata 3334 and data 3335 (either cached or a full database) may be stored in volatile memory such as memory 3360. Data storage device 3330 may also store data and other program code for providing additional functionality and/or which are necessary for operation of apparatus 3300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
  a memory storing processor-executable process steps; and
  a processor to execute the processor-executable process steps to cause the system to:
    identify editing of an active document by a user; and
    in response to the identified editing:
      set enqueue locks on the active document;
      create: 1. a draft document corresponding to the active document, and 2. an enqueue context associated with the draft document, wherein the enqueue context is created to associate the set enqueue locks with the draft document;
      store the enqueue context with the draft document and attach the enqueue context to a request session;
      determine an eTag of the active document and store the eTag with the draft document; and associate the user with the draft document as its exclusive user determine one or more modifying operations to the draft document, each of the one or more modifying operations occurring within a configured durable enqueue lock expiration time of a prior modifying operation;

detect that a time since a last determined modifying operation exceeds the configured durable enqueue lock expiration time; and in response to the detection, dequeue all durable enqueue locks bound to the enqueue context associated with the draft document and send a notification to the user.

2. A system according to claim 1, the processor to further execute the processor-executable process steps to cause the system to:

transfer the active document into an optimistic lock;
receive an instruction to activate the modified draft;
in response to the instruction to activate the modified draft, attach an enqueue context, lock the active document, and compare eTags of the draft document and active document;
if the compared eTags match, update the active document with the changes to the draft document, delete the draft document, and release all enqueue locks; and
if the compared eTags do not match, discard the draft document.

3. A system comprising:
a memory storing processor-executable process steps; and
a processor to execute the processor-executable process steps to cause the system to:
identify editing of an active document by a user; and
in response to the identified editing:
set enqueue locks on the active document;
create a draft document corresponding to the active document and an enqueue context associated with the draft document;
store the enqueue context with the draft document and attach the enqueue context to a request session;
determine an eTag of the active document and store the eTag with the draft document; and
associate the user with the draft document as its exclusive user;
determine one or more modifying operations to the draft document, each of the one or more modifying operations occurring within a configured durable enqueue lock expiration time of a prior modifying operation;
detect that a time since a last determined modifying operation exceeds the configured durable enqueue lock expiration time minus a warning interval; and
in response to the detection, transmit a notification to the user indicating an upcoming lock expiration.

4. A system according to claim 3, the processor to further execute the processor-executable process steps to cause the system to:

detect that a time since the last determined modifying operation exceeds the configured durable enqueue lock expiration time; and
in response to the detection, dequeue all durable enqueue locks bound to the enqueue context associated with the draft document and send a second notification to the user indicating lock expiration.

5. A system according to claim 4, the processor to further execute the processor-executable process steps to cause the system to:

transfer the active document into an optimistic lock;
receive an instruction to activate the modified draft;
in response to the instruction to activate the modified draft, attach an enqueue context, lock the active document, and compare eTags of the draft document and active document;
if the compared eTags match, update the active document with the changes to the draft document, delete the draft document, and release all enqueue locks; and
if the compared eTags do not match, discard the draft document.

6. A computer-implemented method comprising:
identifying editing of an active document by a user; and
in response to the identified editing:
setting enqueue locks on the active document;
creating: 1. a draft document corresponding to the active document, and 2. an enqueue context associated with the draft document, wherein the enqueue context is created to associate the set enqueue locks with the draft document;
storing the enqueue context with the draft document and attach the enqueue context to a request session;
determining an eTag of the active document and store the eTag with the draft document; and
associating the user with the draft document as its exclusive user;
determining one or more modifying operations to the draft document, each of the one or more modifying operations occurring within a configured durable enqueue lock expiration time of a prior modifying operation;
detecting that a time since a last determined modifying operation exceeds the configured durable enqueue lock expiration time; and
in response to the detection, dequeuing all durable enqueue locks bound to the enqueue context associated with the draft document and sending a notification to the user.

7. A method according to claim 6, further comprising:
transferring the active document into an optimistic lock;
receiving an instruction to activate the modified draft;
in response to the instruction to activate the modified draft, attaching an enqueue context, locking the active document, and comparing eTags of the draft document and active document;
if the compared eTags match, updating the active document with the changes to the draft document, deleting the draft document, and releasing all enqueue locks; and
if the compared eTags do not match, discarding the draft document.

8. A method comprising:
identifying editing of an active document by a user; and
in response to the identified editing:
setting enqueue locks on the active document;
creating: 1. a draft document corresponding to the active document, and 2. an enqueue context associated with the draft document, wherein the enqueue context is created to associate the set enqueue locks with the draft document;
storing the enqueue context with the draft document and attach the enqueue context to a request session;
determining an eTag of the active document and store the eTag with the draft document; and
associating the user with the draft document as its exclusive user;
determining one or more modifying operations to the draft document, each of the one or more modifying operations occurring within a configured durable enqueue lock expiration time of a prior modifying operation;

detecting that a time since a last determined modifying operation exceeds the configured durable enqueue lock expiration time minus a warning interval; and in response to the detection, transmitting a notification to the user indicating an upcoming lock expiration.

9. A method according to claim 8, further comprising:

detecting that a time since the last determined modifying operation exceeds the configured durable enqueue lock expiration time; and in response to the detection, dequeuing all durable enqueue locks bound to the enqueue context associated with the draft document and sending a second notification to the user indicating lock expiration.

10. A method according to claim 9, further comprising:

transferring the active document into an optimistic lock;

receiving an instruction to activate the modified draft;

in response to the instruction to activate the modified draft, attaching an enqueue context, lock the active document, and comparing eTags of the draft document and active document;

if the compared eTags match, updating the active document with the changes to the draft document, deleting the draft document, and releasing all enqueue locks; and if the compared eTags do not match, discarding the draft document.

* * * * *